(12) United States Patent
Ooi et al.

(10) Patent No.: US 8,476,871 B2
(45) Date of Patent: Jul. 2, 2013

(54) METHOD AND SYSTEM FOR CONTROLLING A DOUBLY-FED INDUCTION MACHINE

(75) Inventors: Boon T. Ooi, Montreal (CA); Baike Shen, Richmond (CA); Victor Low, Pointe Claire (CA)

(73) Assignee: The Royal Institution for the Advancement of Learning/McGill University, Montreal, Quebec (CA)

( * ) Notice: Subject to any disclaimer, the term of this patent is extended or adjusted under 35 U.S.C. 154(b) by 841 days.

(21) Appl. No.: 12/516,698

(22) PCT Filed: Nov. 28, 2007

(86) PCT No.: PCT/CA2007/002137
§ 371 (c)(1),
(2), (4) Date: Dec. 22, 2009

(87) PCT Pub. No.: WO2008/064472
PCT Pub. Date: Jun. 5, 2008

(65) Prior Publication Data
US 2010/0114388 A1    May 6, 2010

Related U.S. Application Data

(60) Provisional application No. 60/867,510, filed on Nov. 28, 2006.

(51) Int. Cl.
*H02P 9/00* (2006.01)
(52) U.S. Cl.
USPC .............................. 322/24; 322/29

(58) Field of Classification Search
USPC .............................. 322/22, 23, 24, 25, 29, 37
See application file for complete search history.

(56) References Cited

U.S. PATENT DOCUMENTS

| | | | |
|---|---|---|---|
| 7,579,702 B2 * | 8/2009 | Park et al. | 290/44 |
| 7,964,980 B2 * | 6/2011 | Ichinose et al. | 290/44 |
| 8,008,885 B2 * | 8/2011 | Jones et al. | 318/800 |
| 8,198,742 B2 * | 6/2012 | Jorgensen et al. | 290/44 |
| 8,395,360 B2 * | 3/2013 | Tripathi et al. | 322/29 |
| 2007/0182383 A1 * | 8/2007 | Park et al. | 322/89 |
| 2008/0150285 A1 * | 6/2008 | Corcelles Pereira et al. | 290/44 |

* cited by examiner

*Primary Examiner* — Nicholas Ponomarenko
(74) *Attorney, Agent, or Firm* — Freedman & Associates

(57) ABSTRACT

The present invention relates to a method and system for controlling a doubly-fed induction machine. In operation a rotor current vector is processed with a rotor position estimate vector. A scalar error quantity is the determined in dependence upon a stator current vector and the processed rotor current vector. The scalar error quantity is integrated and an estimate of the rotor angular frequency is determined in dependence upon the integrated scalar error quantity. To obtain a rotor position estimate, the estimate of the rotor angular frequency is integrated and a rotor position estimate vector is determined in dependence upon the rotor position estimate. The rotor position estimate vector is then provided for processing the rotor current vector. As output signals a signal indicative of the rotor position estimate vector and a signal indicative of the estimate of the rotor angular frequency are provided for controlling the doubly-fed induction machine.

38 Claims, 27 Drawing Sheets

METHOD AND SYSTEM FOR CONTROLLING A DOUBLY-FED INDUCTION MACHINE

This application claims the benefit under 35 U.S.C. 119(e) of United States Provisional Application No. 60/867,510 filed on Nov. 28, 2006.

FIELD OF THE INVENTION

This invention relates generally to the field of controlling doubly-fed induction machines and more particularly to a method and system for decoupled P-Q control absent mechanical sensors.

BACKGROUND OF THE INVENTION

The doubly-fed induction machine has several advantages over conventional induction machines in various applications such as generators—for example, in Wind Turbine Generators (WTGs), motors—for example, as electric drives in vehicles, or as a combination of a generator and a motor—for example in flywheel emergency power generators. Firstly, since the rotor excitation is controlled by the VCS, the doubly-fed induction machine is able to both import and export reactive power enabling the doubly-fed induction machine to remain connected to the electric grid during substantial voltage disturbances. Secondly, the control of the rotor excitation enables the doubly-fed induction machine to remain synchronized with the electric grid while the rotor—for example connected to a wind turbine—varies in speed. A variable speed wind turbine utilizes the available wind resource more efficiently than a fixed speed wind turbine.

The decoupled P-Q control of a doubly-fed induction machine requires information about the position of the rotor winding axes with respect to the stator winding axes. Decoupled P-Q control techniques absent mechanical sensors as disclosed, for example, in:

L. Xu and W. Cheng, "Torque and reactive power control of a double fed induction machine by position sensorless scheme", IEEE Trans. Ind. Applicant., Vol. 31 pp. 636-642, May/June 1995;

R. Pena, J. C. Clare, and G. M. Asher, "Doubly-fed induction generator using back-to-back PWM converters and its application to variable-speed wind-energy generation", Proc. Inst. Elect. Eng., Pt. B, Vol. 143 No. 3, pp. 231-241, May 1996;

L. Morel, H. Godfroid, A. Miraian, and J. M. Kauffmann, "Doubly-fed induction machine: converter optimization and field oriented control without position sensor", Proc. Inst. Elect. Eng., Pt. B, Vol. 145, No. 4, pp. 360-368, July 1998; and, H. Akagi and H. Sato, "Control an performance of a Douly-Fed Induction Machine intended for a flywheel energy storage system", IEEE Trans. On Power Elect., Vol. 17, No. 1, January 2002;

are based on determining the rotor position from knowledge of numerous parameters of the doubly-fed induction machine and information of the instantaneous voltages and currents. A major disadvantage of these methods is that they are dependent on machine parameters that change over a time period of machine operation such as, for example, changing rotor resistances due to wear in the brush slip ring contact.

It would be highly desirable to overcome these drawbacks and to provide a method and system for decoupled P-Q control absent mechanical sensors that is independent from changing machine parameters.

SUMMARY OF THE INVENTION

It is, therefore, an object of the invention to provide a method and system for decoupled P-Q control of a doubly-fed induction machine absent mechanical sensors that is independent from changing machine parameters.

In accordance with the present invention there is provided a method comprising:

receiving signals indicative of stator currents and rotor currents of a doubly-fed induction machine, the stator currents and the rotor currents being represented as a 2-phase vector in a $\alpha$-$\beta$ coordinate frame;

processing the rotor current vector with a rotor position estimate vector;

determining a scalar error quantity in dependence upon the stator current vector and the processed rotor current vector;

integrating the scalar error quantity;

determining an estimate of the rotor angular frequency in dependence upon the integrated scalar error quantity;

determining a rotor position estimate by integrating the estimate of the rotor angular frequency;

determining a rotor position estimate vector in dependence upon the rotor position estimate;

providing the rotor position estimate vector for processing the rotor current vector; and, providing a signal indicative of the rotor position estimate vector and a signal indicative of the estimate of the rotor angular frequency for controlling the doubly-fed induction machine.

In accordance with the present invention the method further comprises:

receiving signals indicative of stator voltages of the doubly-fed induction machine, the stator voltages being represented as a 2-phase vector in a $\alpha$-$\beta$ coordinate frame;

converting the stator voltages into a $\gamma$-$\delta$ coordinate frame using stator phase angle information;

determining a magnetization current vector in dependence upon the stator voltages in the $\gamma$-$\delta$ coordinate frame and a magnetization reactance;

converting the magnetization current vector into the d-q coordinate frame using the stator phase angle information; and, combining the magnetization current vector and the stator current vector.

In accordance with the present invention the method yet further comprises:

converting the rotor current vector into the $\gamma$-$\delta$ coordinate frame using the rotor position estimate vector;

receiving signals indicative of stator voltages of the doubly-fed induction machine, the stator voltages being represented as a 2-phase vector in a $\alpha$-$\beta$ coordinate frame determining complex powers $P_S$, $Q_S$ in dependence upon stator voltages and stator currents;

determining complex reference powers $P_S^*$, $Q_S^*$ using the estimate of the rotor angular frequency;

determining respective power errors by comparing the complex reference powers $P_S^*$, $Q_S^*$ with the complex powers $P_S$, $Q_S$;

determining respective stator reference currents by integrating the power errors;

determining a magnetization current and subtracting the same from the stator reference currents;

determining control voltages by comparing the converted rotor current vector with the stator reference currents in negative feedback; and, converting the control voltages from the γ-δ coordinate frame into a coordinate frame suitable for controlling the doubly-fed induction machine.

In accordance with the present invention the method yet further comprises:
determining a first estimate of the rotor angular frequency in dependence upon the integrated scalar error quantity and determining a second estimate of the rotor angular frequency in dependence upon the integrated scalar error quantity by using the first estimate of the rotor angular frequency as central frequency and adding the same to the integrated scalar error quantity.

In accordance with the present invention there is provided a system comprising:
a mixer for receiving a signal indicative of rotor currents of a doubly-fed induction machine and a signal indicative of a rotor position estimate vector, the rotor currents being represented as a 2-phase vector in a α-β coordinate frame, the mixer for processing the rotor current vector with the rotor position estimate vector;
a detector connected to the mixer, the detector for receiving a signal indicative of stator currents of the doubly-fed induction machine, the stator currents being represented as a 2-phase vector in a α-β coordinate frame, the detector for determining a scalar error quantity in dependence upon the stator current vector and the processed rotor current vector;
a first integrator connected to the detector for integrating the scalar error quantity;
an adder connected to the integrator for determining an estimate of the rotor angular frequency by adding the central frequency to the integrated scalar error quantity;
a second integrator connected to the adder for determining a rotor position estimate by integrating the estimate of the rotor angular frequency;
a sin-cos block connected to the second integrator and to the mixer for determining a rotor position estimate vector in dependence upon the rotor position estimate; and,
a first output port interposed between the adder and the second integrator for providing a signal indicative of the estimate of the rotor angular frequency and a second port connected to the sin-cos block for providing the signal indicative of the rotor position estimate vector, the first and the second output port for being connected to a control system of the doubly-fed induction machine.

In accordance with the present invention the system further comprises:
a first coordinate frame transformation block for receiving a signal indicative of stator voltages of the doubly-fed induction machine, the stator voltages being represented as a 2-phase vector in a α-β coordinate frame and for converting the stator voltages into a γ-δ coordinate frame using stator phase angle information;
a magnetization reactance block connected to the first coordinate frame transformation block for determining a magnetization current vector in dependence upon the stator voltages in the γ-δ coordinate frame and a magnetization reactance; and,
a second coordinate transformation block connected to the magnetization reactance block and to the detector for converting the magnetization current vector into a d-q coordinate frame using the stator phase angle information, and wherein the detector combines the magnetization current vector and the stator current vector.

In accordance with the present invention the system yet further comprises:
at least an input coordinate frame transformation block connected to the second port for converting the rotor current vector into a γ-δ coordinate frame using the rotor position estimate vector;
a power calculation block for receiving a signal indicative of stator voltages and the signal indicative of the stator currents and for determining complex powers $P_S$, $Q_S$ in dependence thereupon;
a $P_S$, $Q_S$ reference generator connected to the first port for determining complex reference powers $P_S^*$, $Q_S^*$ using the estimate of the rotor angular frequency;
second adders connected to the $P_S$, $Q_S$ reference generator and to the power calculation block for determining respective power errors by comparing the complex reference powers $P_S^*$, $Q_S^*$ with the complex powers $P_S$, $Q_S$;
third integrators connected to the second adders for determining respective stator reference currents by integrating the power errors;
a magnetization reactance block for determining a magnetization current;
a third adder connected to one of the third integrators and to the magnetization reactance block for combining the magnetization current and one of the stator reference currents;
a negative feedback block connected to one of the third integrators, the third adder, and to the at least an input coordinate frame transformation block for determining control voltages by comparing the converted rotor current vector with the stator reference currents in negative feedback; and,
at least an output coordinate frame transformation block connected to the negative feedback block and to the second port for converting the control voltages from the γ-δ coordinate frame into a coordinate frame suitable for controlling the doubly-fed induction machine.

In accordance with the present invention there is further provided a system comprising:
a mixer for receiving a signal indicative of rotor currents of a doubly-fed induction machine and a signal indicative of a rotor position estimate vector, the rotor currents being represented as a 2-phase vector in a α-β coordinate frame, the mixer for processing the rotor current vector with the rotor position estimate vector;
a first detector connected to the mixer, the detector for receiving a signal indicative of stator currents of the doubly-fed induction machine, the stator currents being represented as a 2-phase vector in a α-β coordinate frame, the detector for determining a scalar error quantity in dependence upon the stator current vector and the processed rotor current vector;
a first integrator connected to the first detector for integrating the scalar error quantity;
a first adder connected to the integrator for determining a first estimate of the rotor angular frequency by adding a central frequency to the integrated scalar error quantity;
a second detector connected to the mixer, the detector for receiving a signal indicative of the stator currents of the doubly-fed induction machine, the stator currents being represented as a 2-phase vector in a α-β coordinate frame, the second detector for determining a second scalar error quantity in dependence upon the stator current vector and the processed rotor current vector;
a second integrator connected to the second detector for integrating the second scalar error quantity;
a second adder connected to the second integrator and to the first adder for determining a second estimate of the rotor angular frequency by adding the first estimate of the rotor angular frequency to the integrated second scalar error quantity;

a third integrator connected to the second adder for determining a rotor position estimate by integrating the second estimate of the rotor angular frequency;

a sin-cos block connected to the second integrator and to the mixer for determining a rotor position estimate vector in dependence upon the rotor position estimate; and, a first output port interposed between the adder and the second integrator for providing a signal indicative of the estimate of the rotor angular frequency and a second port connected to the sin-cos block for providing the signal indicative of the rotor position estimate vector, the first and the second output port for being connected to a control system of the doubly-fed induction machine.

In accordance with the present invention there is further provided a storage medium having stored therein executable commands for execution on at least a processor, the at least a processor when executing the commands performing:

receiving signals indicative of stator currents and rotor currents of a doubly-fed induction machine, the stator currents and the rotor currents being represented as a 2-phase vector in a α-β coordinate frame;

processing the rotor current vector with a rotor position estimate vector;

determining a scalar error quantity in dependence upon the stator current vector and the processed rotor current vector;

integrating the scalar error quantity;

determining an estimate of the rotor angular frequency in dependence upon the integrated scalar error quantity;

determining a rotor position estimate by integrating the estimate of the rotor angular frequency;

determining a rotor position estimate vector in dependence upon the rotor position estimate;

providing the rotor position estimate vector for processing the rotor current vector; and, providing a signal indicative of the rotor position estimate vector and a signal indicative of the estimate of the rotor angular frequency for controlling the doubly-fed induction machine.

In accordance with the present invention the storage medium further comprises executable commands for execution on at least a processor, the at least a processor when executing the commands performing:

receiving signals indicative of stator voltages of the doubly-fed induction machine, the stator voltages being represented as a 2-phase vector in a α-β coordinate frame;

converting the stator voltages into a γ-δ coordinate frame using stator phase angle information;

determining a magnetization current vector in dependence upon the stator voltages in the γ-δ coordinate frame and a magnetization reactance;

converting the magnetization current vector into the d-q coordinate frame using the stator phase angle information; and, combining the magnetization current vector and the stator current vector.

In accordance with the present invention the storage medium further comprises executable commands for execution on at least a processor, the at least a processor when executing the commands performing:

converting the rotor current vector into the γ-δ coordinate frame using the rotor position estimate vector;

receiving signals indicative of stator voltages of the doubly-fed induction machine, the stator voltages being represented as a 2-phase vector in a α-β coordinate frame determining complex powers $P_S$, $Q_S$ in dependence upon stator voltages and stator currents;

determining complex reference powers $P_S^*$, $Q_S^*$ using the estimate of the rotor angular frequency;

determining respective power errors by comparing the complex reference powers $P_S^*$, $Q_S^*$ with the complex powers $P_S$, $Q_S$;

determining respective stator reference currents by integrating the power errors;

determining a magnetization current and subtracting the same from the stator reference currents;

determining control voltages by comparing the converted rotor current vector with the stator reference currents in negative feedback; and, converting the control voltages from the γ-δ coordinate frame into a coordinate frame suitable for controlling the doubly-fed induction machine.

In accordance with the present invention the storage medium further comprises executable commands for execution on at least a processor, the at least a processor when executing the commands performing:

determining a first estimate of the rotor angular frequency in dependence upon the integrated scalar error quantity and determining a second estimate of the rotor angular frequency in dependence upon the integrated scalar error quantity by using the first estimate of the rotor angular frequency as central frequency and adding the same to the integrated scalar error quantity.

BRIEF DESCRIPTION OF THE FIGURES

Exemplary embodiments of the invention will now be described in conjunction with the following drawings, in which.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

While the invention will be described for the control of a Doubly-Fed Induction Generator (DFIG) for use in wind power generation for simplicity, it will become apparent to those skilled in the art that the invention is not limited thereto, but is also applicable for various other applications of doubly-fed induction machines as generators, as motors—for example, as electric drives in vehicles—or as combination of a generator and a motor—for example, in flywheel emergency power generators or in electric drives in vehicles with electric power generation during braking operation.

Figure 1:
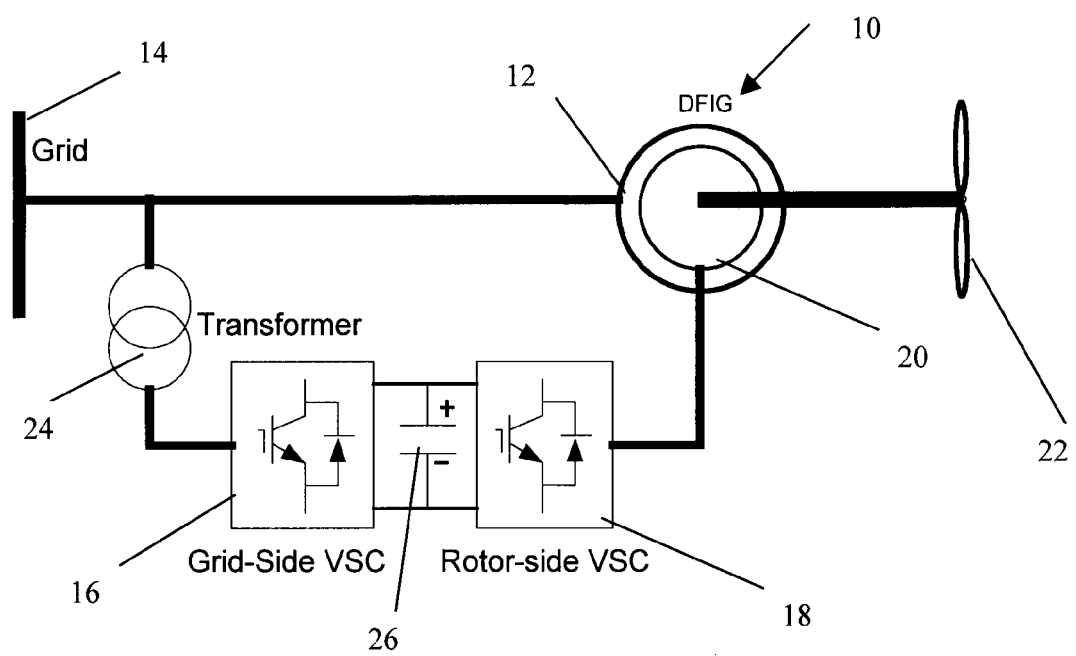
FIG. 1 is a simplified block diagram illustrating a Doubly-Fed Induction Generator (DFIG) for use in wind power generation.
Figure 10:
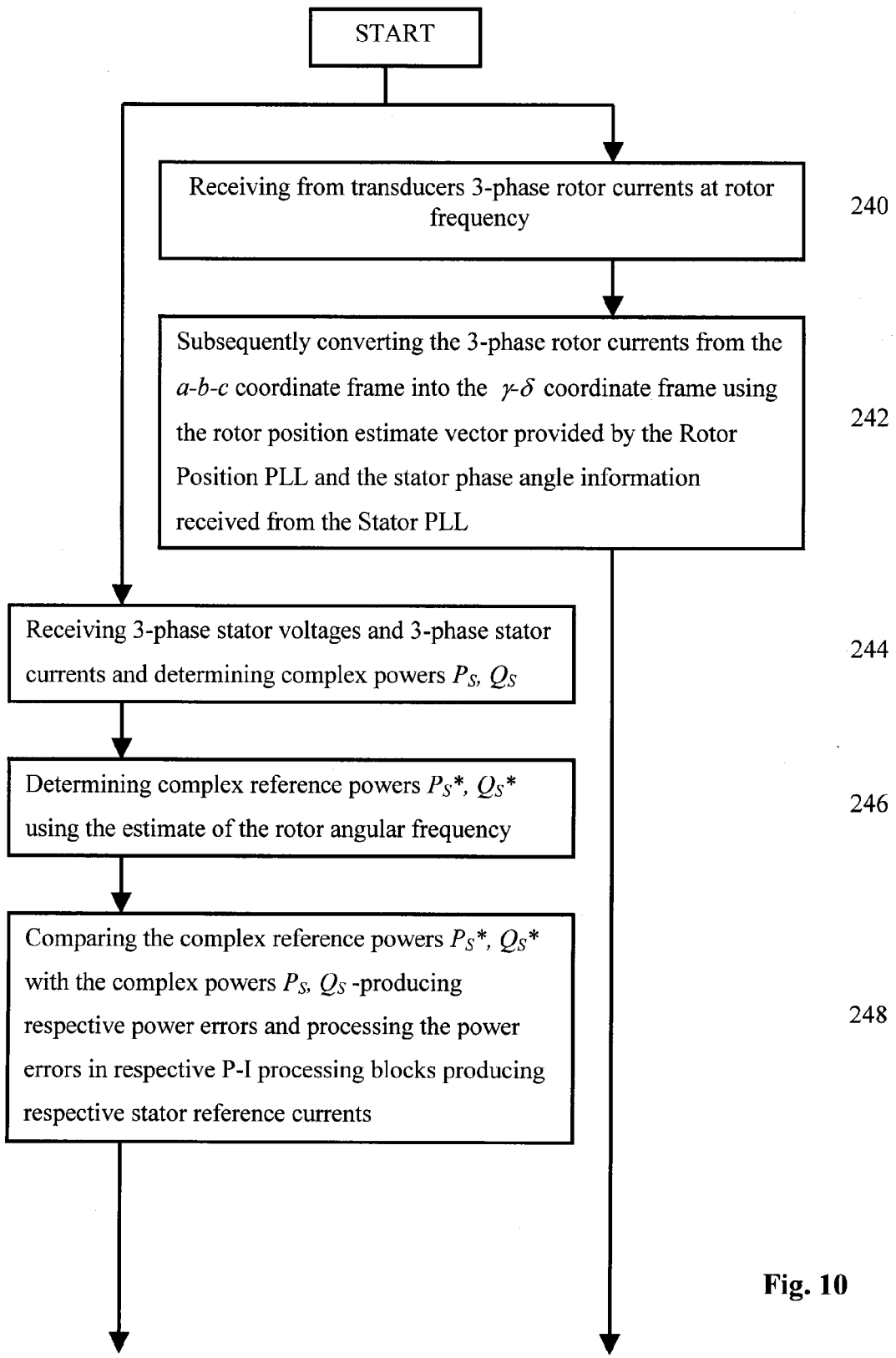
FIG. 10 is a simplified flow diagram illustrating operation of the rotor side VSC control according to embodiments of the invention shown in FIG. 9.
Figure 10:
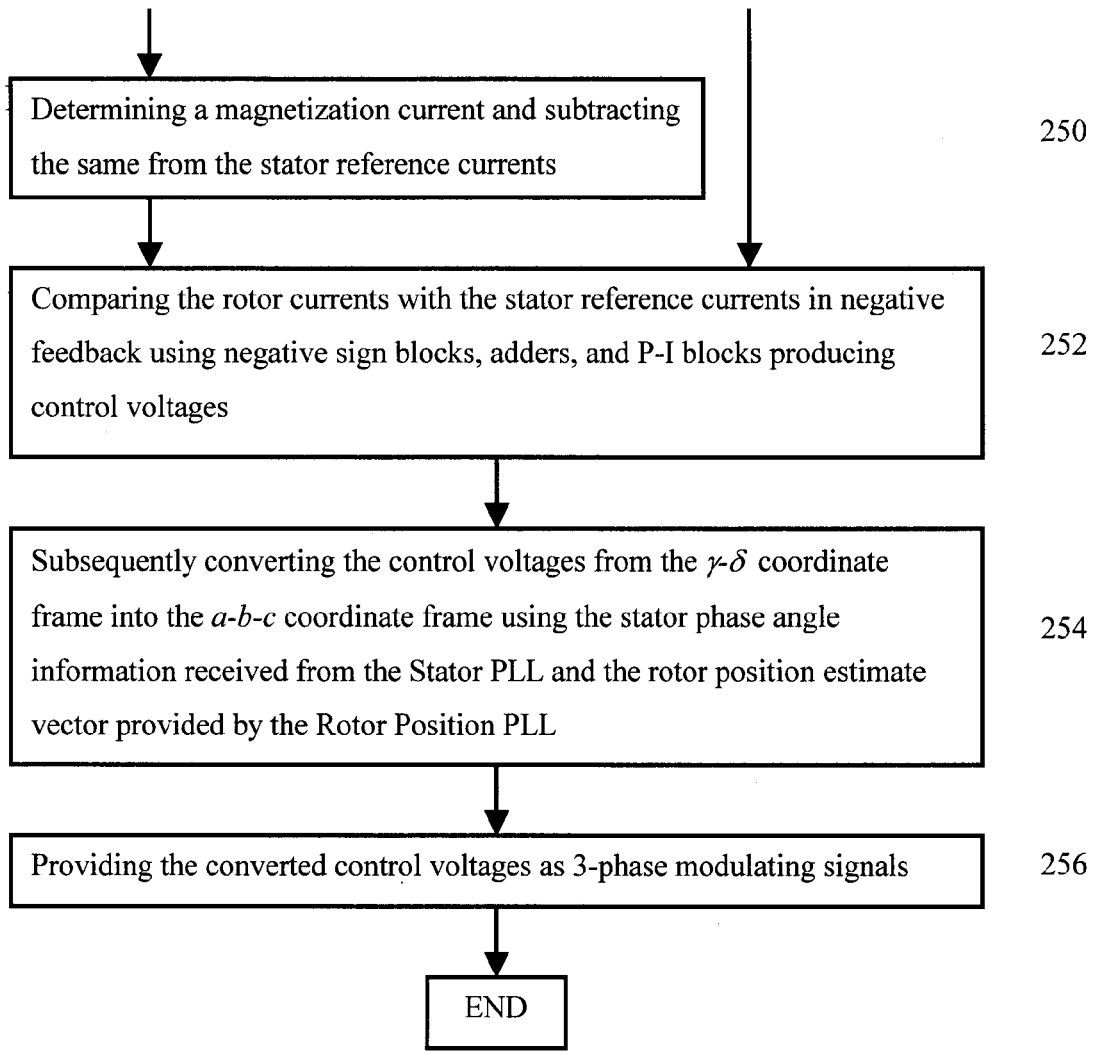

Referring to FIG. 1, and FIG. 10 for use in wind power generation is shown. A stator 12 of the DFIG 10 is directly connected to an ac electric grid 14. Back-to-back VCSs—grid-side VCS 16 and rotor-side VCS 18—connect rotor 20—driven by wind turbine 22—via rotor slip rings at one end to the ac electric grid 14 at the other end via voltage step-up transformer 24. The grid-side VCS regulates dc voltage across dc capacitor 26 and thereby serves as an automatic conduit of the slip power of the rotor to-and-from the ac electric grid 14. The grid-side VCS is well known in the art.

The rotor-side VSC 18 is assigned the task of decoupled P-Q control of the complex power $P_S + jQ_S$ of the stator 12 of the DFIG 10. It is noted, that the "motor convention" is used in the description hereinbelow, i.e. negative $P_S$ corresponds to generated active power. Neglecting ohmic losses, the rotor-side active power is $P_R = S \cdot P_S$ where slip $S = (\omega_s - \omega_m)/\omega_s$, with $\omega_s$ being the stator angular frequency—the synchronous angular frequency of the 3-phase stator voltages—and $\omega_m$ being the rotor angular frequency. The direction of the rotor-side active power $P_R$ changes with the slip S. The active power taken by the stator 12 from the ac electric grid 14 is $P_S = P_{grid}/(1+S)$.

Decoupled P-Q control is performed using voltage current differential equations of a doubly-fed induction machine based on a $\gamma$-$\delta$ synchronously rotating frame:

$$\begin{pmatrix} v_{s\gamma} \\ v_{s\delta} \\ v_{r\gamma} \\ v_{r\delta} \end{pmatrix} = \tag{1}$$

$$\begin{pmatrix} R_s + \frac{d}{dt}L_s & -\omega_s L_s & \frac{d}{dt}L_m & -\omega_s L_m \\ \omega_s L_s & R_s + \frac{d}{dt}L_s & \omega_s L_m & \frac{d}{dt}L_m \\ \frac{d}{dt}L_m & -(\omega_s - \omega_m)L_m & R_r + \frac{d}{dt}L_r & -(\omega_s - \omega_m)L_m \\ (\omega_s - \omega_m)L_m & \frac{d}{dt}L_m & (\omega_s - \omega_m)L_r & R_r + \frac{d}{dt}L_r \end{pmatrix} \begin{pmatrix} i_{s\gamma} \\ i_{s\delta} \\ i_{r\gamma} \\ i_{r\delta} \end{pmatrix}$$

where $L_s = L_{ls} + L_m$, $L_R = L_{lR} + L_m$, with $L_m$ being the magnetization inductance; $L_{ls}$ and $L_{lR}$ being the stator and rotor leakage inductances, respectively; $R_s$ and $R_r$ being stator and rotor resistances, respectively; $\omega_s$ being the stator angular frequency; and $\omega_m$ being the rotor angular frequency.

The stator active power is $P_S = v_{s\gamma} i_{s\gamma} + v_{s\delta} i_{s\delta}$ and the stator reactive power is $Q_S = v_{s\gamma} i_{s\delta} - v_{s\delta} i_{s\gamma}$. Decoupled P-Q control is possible when $v_{s\delta} = 0$ in equations (1). For $v_{s\delta} = 0$ it is assumed that a common $\gamma$-$\delta$ coordinate frame has been established for both, the stator and the rotor. When $v_{s\delta} = 0$, $P_S = v_{s\gamma} i_{s\gamma}$ and $Q_S = v_{s\gamma} i_{s\delta}$. Under this decoupled condition, the stator complex power references $P_S^*$ and $Q_S^*$ are controlled by the stator current references $i_{s\gamma}^* = P_S^*/v_{s\gamma}$ and $i_{s\delta}^* = Q_S^*/v_{s\gamma}$, respectively. The * symbol denotes a reference value. Since the DFIG is controlled from the rotor side, rotor current references are determined. The rotor current references $i_{R\gamma}^*$ and $i_{R\delta}^*$ are obtained by solving the rotor currents from the first and second rows of equation (1). Neglecting the d/dt terms, the rotor current references are determined as:

$$\begin{pmatrix} i_{R\gamma}^* \\ i_{R\delta}^* \end{pmatrix} = \begin{pmatrix} \dfrac{(-\omega_s L_s i_{s\gamma}^* - R_s i_{s\delta}^*)}{\omega_s L_m} \\ \dfrac{(-V_{S\gamma} - \omega_s L_s i_{s\delta}^* + R_s i_{s\gamma}^*)}{\omega_s L_m} \end{pmatrix}. \tag{2}$$

Figure 2:
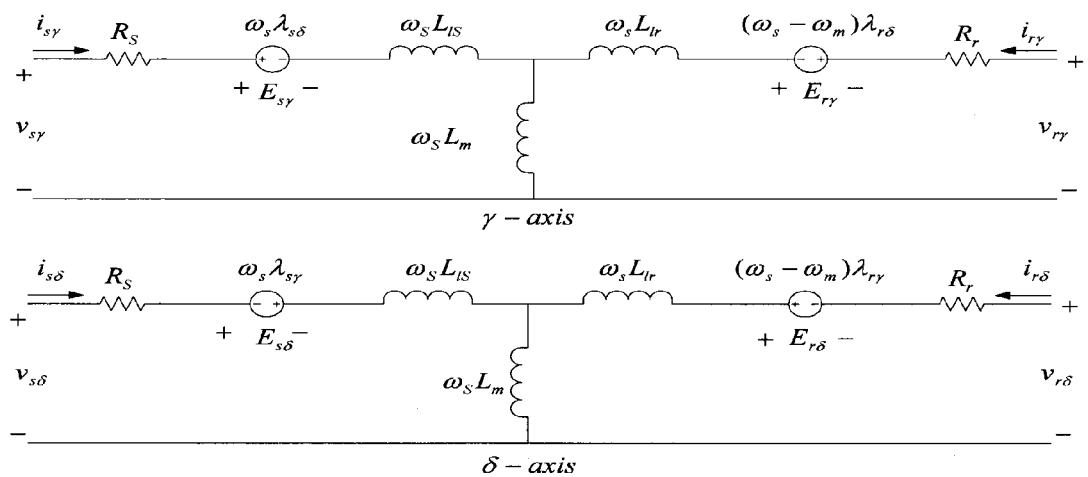
FIGS. 2 and 3 are simplified block diagrams illustrating equivalent electrical circuits of the DFIG shown in FIG. 1.
Figure 3:
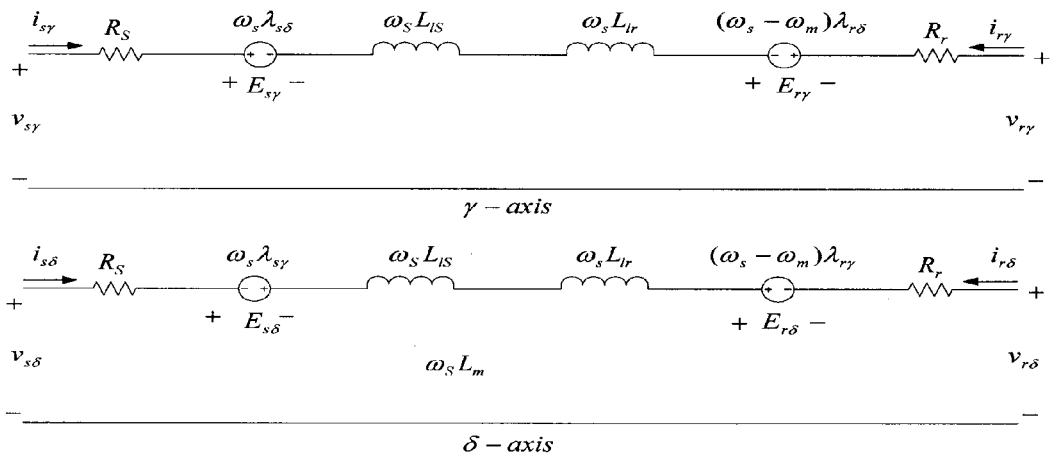

Referring to FIG. 2, an equivalent circuit to equation (1) is shown. Power transfer from the stator windings to the rotor windings across an airgap therebetween, and vice versa, takes place by electromagnetic induction. To ensure the power transfer across the airgap induction machines are designed to have a magnetization reactance $\omega_s L_m$ that is as large as possible. When the magnetization reactance $\omega_s L_m$ is small, the current from the stator side in FIG. 2 is "shunted" through it and does not reach the rotor side. Likewise, the rotor current does not reach the stator side. Therefore, the induction machine is designed having a sufficiently large magnetization reactance that it is possible to approximate the circuit as an open circuit, as shown in FIG. 3. Using this approximation, the rotor currents are approximated as being equal and opposite to the stator currents:

$$\begin{pmatrix} i_{r\gamma} \\ i_{r\delta} \end{pmatrix} \approx -\begin{pmatrix} i_{s\gamma} \\ i_{s\delta} \end{pmatrix}. \tag{3}$$

Alternatively, because $\omega_s L_m$ is large, $R_s/\omega_s L_m \approx 0$, $L_s \approx L_m$, and $v_{s\gamma}/\omega_s L_m \approx 0$. Therefore equation (2) reduces to:

$$\begin{pmatrix} i^*_{r\gamma} \\ i^*_{r\delta} \end{pmatrix} \approx -\begin{pmatrix} i^*_{s\gamma} \\ i^*_{s\delta} \end{pmatrix} + \begin{pmatrix} 0 \\ -v_{S\gamma}/L_m\omega_S \end{pmatrix} = -\begin{pmatrix} i^*_{S\gamma} \\ i^*_{S\delta} \end{pmatrix}, \tag{4}$$

which is consistent with equation (3).

The problem in implementing the decoupled P-Q control is the absence of knowledge of the position of the rotor winding axes with respect to the stator winding axes. Normally, the axes of the γ-δ coordinate frame rotate with the synchronous speed $\omega_s$ of the 3-phase stator voltages. The rotor magnetic flux is rotating at slip angular frequency $\omega_r$ with respect to the rotor windings which are themselves rotating at the angular frequency $\omega_m$ so that the rotor flux is also rotating at synchronous speed $(\omega_r + \omega_m) = \omega_S$. In order to be able to ensure that $v_{s\delta}=0$ it is necessary to know the position of the rotor winding axes with respect to the stator winding axes.

In order to provide a better understanding of the invention a brief review of reference frame transformations will be presented hereinbelow.

a-b-c to 0-α-β Coordinate Frame Transformation

Figure 4A:
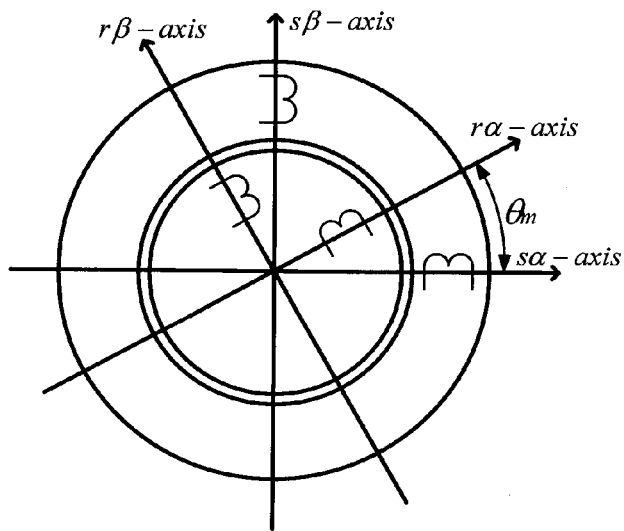
FIGS. 4a and 4b are diagrams illustrating stator and rotor axes in the α-β coordinate frame and in the d-q coordinate frame, respectively.

The a-b-c to 0-α-β transformation is applied to the 3-phase stator voltages, the 3-phase stator currents and the 3-phase rotor currents of the DFIG 10. The zero sequence is excluded because both the 3-phase stator and rotor windings are wye-connected absent a fourth wire return. The a-phase stator winding is co-axial with the α-phase stator winding of the 2-phase system in the α-β coordinate frame. As will be described hereinbelow, it is also the co-axial to the d-phase stator winding. FIG. 4a illustrates the angle $\theta_m$ between the α-stator axis and the α-rotor axis in the α-β coordinate frame. The function of a Rotor Position Lock Loop (PLL) as will be described hereinbelow is to track $\theta_m$ for ensuring that $v_{s\delta}=0$. In the α-β coordinate frame the stator current and the rotor current vectors are:

$$\begin{bmatrix} i_{S\alpha} \\ i_{S\beta} \end{bmatrix} = \begin{bmatrix} I_S \cos(\omega_S t + \delta_{iS}) \\ I_S \sin(\omega_S t + \delta_{iS}) \end{bmatrix} \tag{5}$$

and $$\begin{bmatrix} i_{r\alpha} \\ i_{r\beta} \end{bmatrix} = \begin{bmatrix} I_r \cos(\omega_r t + \delta_{ir}) \\ I_r \sin(\omega_r t + \delta_{ir}) \end{bmatrix}, \tag{6}$$

respectively.

α-β to d-q Coordinate Frame Transformation

Figure 4B:
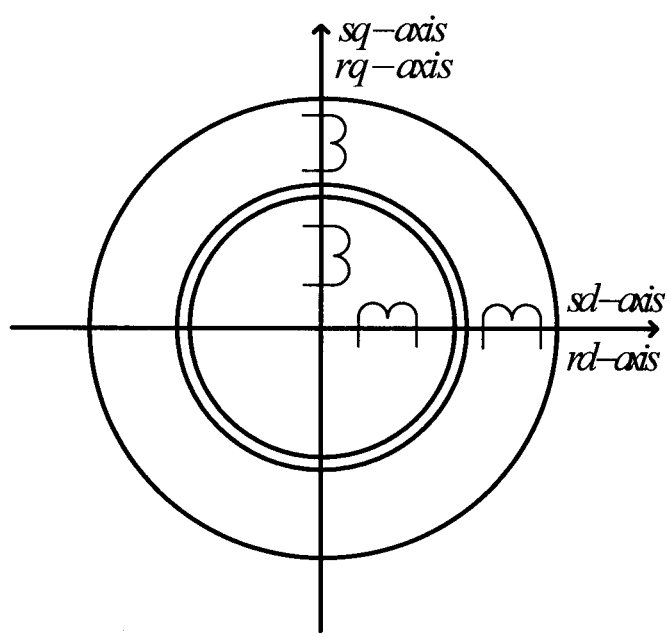

As illustrated in FIG. 4b, the axes of both the stator and the rotor windings are stationary and co-axial in the d-q coordinate frame. The stator axes in the d-q coordinate frame are the same as the stator axes in the α-β coordinate frame, therefore, $[i_{Sd}, i_{Sq}]^T = [i_{S\alpha}, i_{S\beta}]^T$. Because the rotor turns at the angular frequency of $\omega_m$ from its initial position $\delta_m$, in transforming to the d-q frame, the rotor currents undergo a rotational transformation by the matrix $[e^{j\theta_m}]$ where $\theta_m = \omega_m t + \delta_m$. It is be noted that $\theta_m$ and $\omega_m$ are given as electrical radians and electrical radians/second so as to avoid carrying the pole-pair conversion from mechanical radians and mechanical radians/second. The transformation matrix is:

$$[e^{j\theta_m}] = \begin{bmatrix} \cos\theta_m & -\sin\theta_m \\ \sin\theta_m & \cos\theta_m \end{bmatrix}. \tag{7}$$

The resultant rotor current vector in the d-q coordinate frame is:

$$\begin{bmatrix} i_{rd} \\ i_{rq} \end{bmatrix} = \begin{bmatrix} I_r \cos(\omega_r t + \delta_{ir} + \omega_m t + \delta_m) \\ I_r \sin(\omega_r t + \delta_{ir} + \omega_m t + \delta_m) \end{bmatrix} \tag{8}$$

From induction machine theory follows: $\omega_S = \omega_m + \omega_r$, thus the magnetic flux produced by the stator currents $[i_{Sd}, i_{Sq}]^T$ and the rotor currents $[i_{rd}, i_{rq}]^T$ are both rotating at synchronous angular frequency $\omega_S$.

d-q to γ-δ Coordinate Frame Transformation

In transforming to the γ-δ coordinate frame, the rotational transformation matrix $$[e^{-j\theta_s}] = \begin{bmatrix} \cos\theta_s & \sin\theta_s \\ -\sin\theta_s & \cos\theta_s \end{bmatrix}, \tag{9}$$

where $\theta_S = \omega_S t$, is multiplied to $[i_{Sd}, i_{Sq}]^T$ and $[i_{rd}, i_{rq}]^T$. It is noted that $[e^{-j\theta_S}]$ is the inverse transformation of $[e^{j\theta_S}]$ because the negative sign indicates that the angle $\theta_S$ is "subtracted from" and not "added to" the argument. Thus the resultant vectors in the γ-δ coordinate frame are: $[i_{S\gamma}, i_{S\delta}]^T = [I_S \cos \delta_{iS}, I_S \sin \delta_{iS}]^T$ for the stator currents; and, $[i_{r\gamma}, i_{r\delta}]^T = [I_r \cos(\delta_{ir} + \delta_m), I_r \sin(\delta_{ir} + \delta_m)]^T$ for the rotor currents.

Because the stator and rotor windings are co-axial in the d-q coordinate frame, as illustrated in FIG. 4b, they are also co-axial in the γ-δ coordinate frame. The above coordinate transformations illustrate that it is necessary to know the rotor position $\theta_m = \omega_m t + \delta_m$ in order to align the rotor axes to the stator axes in the γ-δ coordinate frame prior application of the equations (1).

The rotational transformation $[e^{jX}]$ by the matrix of equations (7) and (9), adds an angle X to the argument Y as summarized in equation (10):

$$\begin{pmatrix} \cos(Y+X) \\ \sin(Y+X) \end{pmatrix} = \begin{pmatrix} \cos X & -\sin X \\ \sin X & \cos X \end{pmatrix} \begin{pmatrix} \cos Y \\ \sin Y \end{pmatrix}. \tag{10}$$

Figure 5:
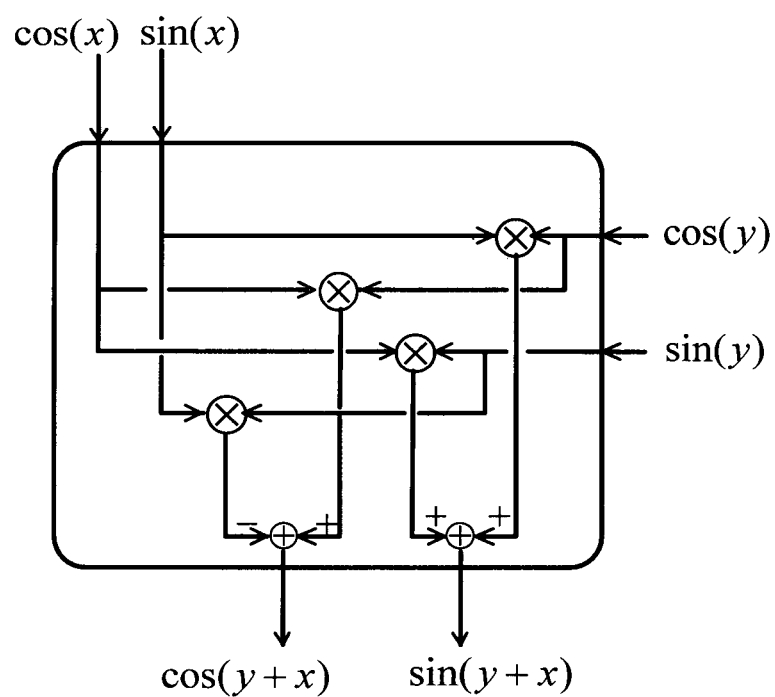
FIG. 5 is a simplified block diagram illustrating an implementation of the rotational transformation [$e^{jX}$] using multipliers ⊗ and adders ⊕.

When X is negative, because $\cos(-X)=\cos(X)$ and $\sin(-X)=-\sin(X)$, the angle is subtracted. FIG. 5 illustrates an implementation of the rotational transformation $[e^{jX}]$ using multipliers ⊗ and adders ⊕.

The rotor-side VSC 18 comprises a Stator PLL system and a Rotor Position PLL system. The Stator PLL system tracks the 3-phase stator voltage and determines a difference between the angle $(\omega_{SV}t + \delta_{SV})$ of the 3-phase stator voltage and an unknown phase angle $(\omega_y t + \delta_y)$, minimizes the difference in a negative feedback fashion, i.e. $(\omega_y t + \delta_y)$ converges to $(\omega_{SV}t + \delta_{SV})$, and provides the stator voltage phase angle $(\omega_y t + \delta_y)$.

Figure 6:
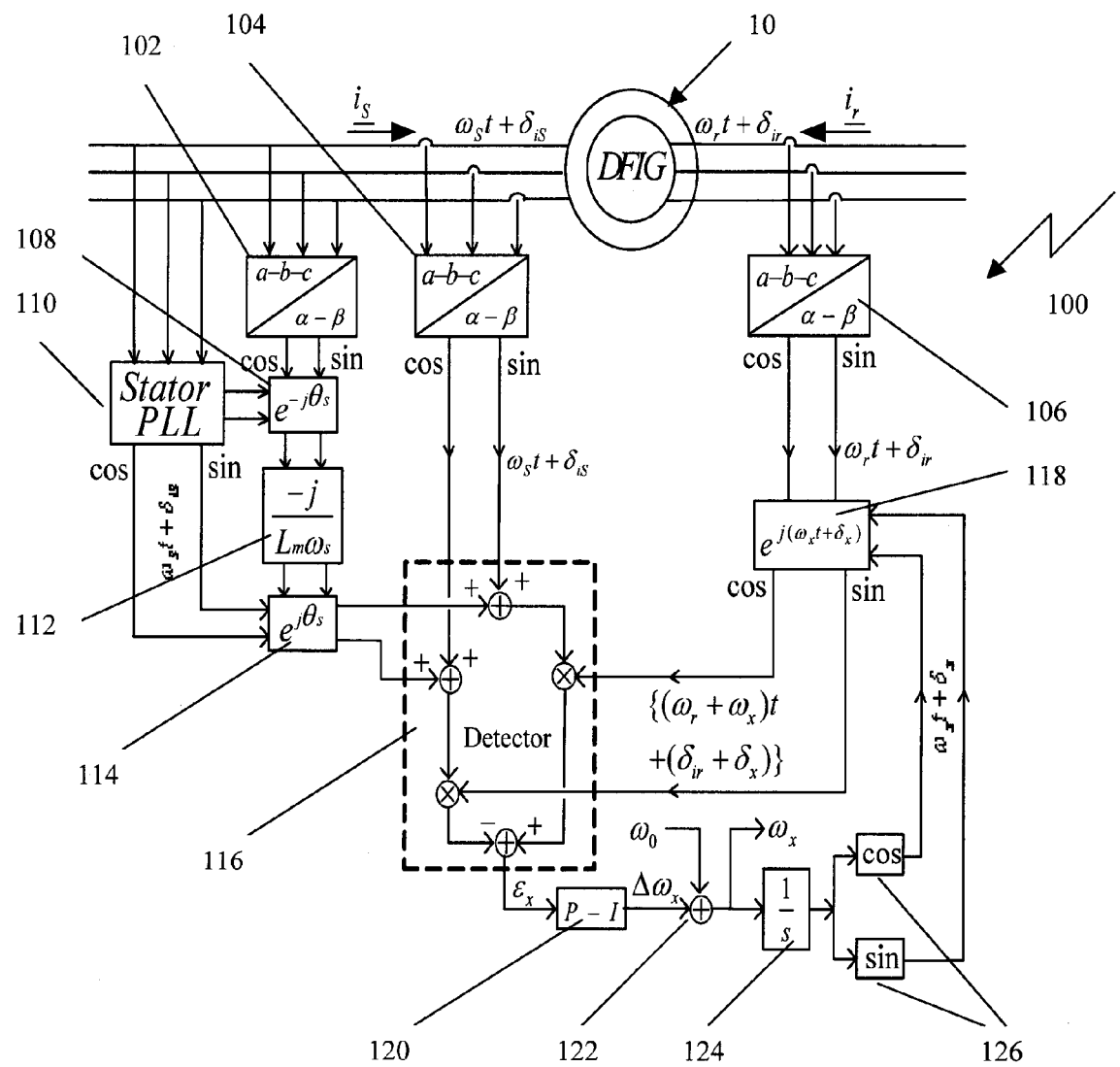
FIG. 6 is a simplified block diagram of a first embodiment of a Rotor Position PLL system according to embodiments of the invention.

Referring to FIG. 6, a simplified block diagram of a first embodiment of a Rotor Position PLL system 100 according to embodiments of the invention is shown. The Rotor Position PLL system 100 receives from transducers signals indicative of the 3-phase stator currents, the 3-phase rotor currents, and the 3-phase stator voltages and from the Stator PLL a signal indicative of the phase angle. The output signal is indicative of a rotor angular frequency and position $\theta_m = \omega_m t + \delta_m$. The 3-phase a-b-c quantities are converted to 2-phase $\alpha$-$\beta$ quantities in coordinate frame transformation blocks 102, 104, and 106 for the stator voltages, the stator currents, and the rotor currents, respectively. FIG. 6 depicts 2-phase information channels with cos(..) and sin(..) symbols under the transformation blocks denoting the channels containing the cosine and the sine of arguments. The arguments are the angles $\theta_x = \omega_x t + \delta_x$, $\theta_S = \omega_S t + \delta_S$, and $\theta_r = \omega_r t + \delta_r$ for the channels of blocks 126, 104, and 106, respectively.

The operation of the Rotor Position PLL 100 is based on the same principle as the Stator PLL described above with the algebraic unknown ($\omega_x t + \delta_x$) being added to the rotor current angle ($\omega_{ir} t + \delta_{ir}$) such that the angle [($\omega_{ir} + \omega_x)t + \delta_{ir} + \delta_x$)] tracks the angle ($\omega_S t + \delta_S$) of the stator currents. On convergence, ($\omega_x t + \delta_x$) yields the angle of rotation of the rotor, which is $\theta_m = \omega_m t + \delta_m$.

Figure 7A:
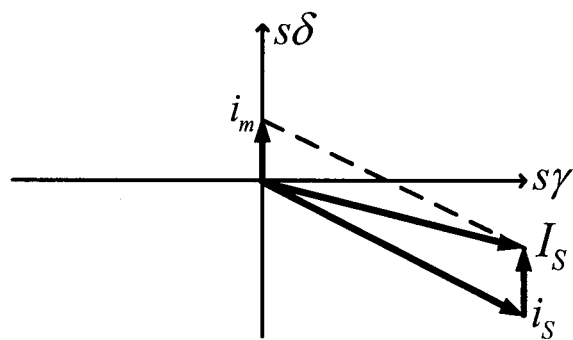
FIGS. 7a to 7c are diagrams illustrating the criterion for phase angle lock.
Figure 7B:
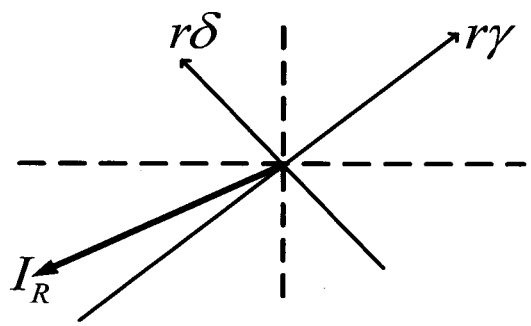
Figure 7C:
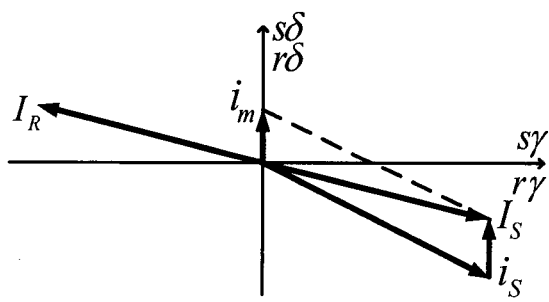

Because the decoupled P-Q control is based on the condition that $v_{S\delta} = 0$ resulting in equation (4), the criterion for locking is based on equation (4). The resulting space-vector $I_S$ formed by the stator currents $$\begin{pmatrix} i_{S\gamma} \\ i_{S\delta} \end{pmatrix} + \begin{pmatrix} 0 \\ v_{S\gamma}/L_m \omega_S \end{pmatrix}$$

is shown in FIG. 7a. The resulting space-vector $I_R$ formed by the rotor currents $$\begin{pmatrix} i_{r\gamma} \\ i_{r\delta} \end{pmatrix}$$

is shown in FIG. 7b. As FIGS. 7a and 7b illustrate, the $\gamma$-$\delta$ axes of the stator and the rotor are, in general, not aligned. By aligning the space-vector $I_R$ to the space-vector $I_S$, as illustrated in FIG. 7c, both $\gamma$-$\delta$ axes are coincident and, therefore equation (1) is valid.

The magnetization currents are determined using the stator voltages in the $\gamma$-$\delta$ coordinate frame and dividing them by the magnetization reactance $jL_m\omega_S$. The stator voltages become the vector $V_S$ [cos($\omega_S t$),0)]$^T$ after the a-b-c to $\alpha$-$\beta$ coordinate frame transformation. As shown in FIG. 6, the stator voltages in the $\alpha$-$\beta$ coordinate frame—which is the same as the d-q frame—are then transformed to the stator voltages in the $\gamma$-$\delta$ coordinate frame using the [$e^{-j\theta_S}$] coordinate frame transformation block 108. The angle used in the [$e^{-j\theta_S}$] coordinate frame transformation block 108 is obtained from the Stator PLL 110. The stator PLL provides the vector of reference angles [cos($\omega_S t$), sin($\omega_S t$)]$^T$. The resulting stator voltage vector in the $\gamma$-$\delta$ coordinate frame is [$v_{s\gamma}$ 0]. To obtain $$\begin{pmatrix} 0 \\ -v_{S\gamma}/L_m\omega_S \end{pmatrix},$$

the stator voltage vector is multiplied by $$\begin{bmatrix} 0 & 1 \\ \frac{-1}{L_m\omega_S} & 0 \end{bmatrix}$$

in magnetization reactance block 112 resulting in the magnetization current vector in the $\gamma$-$\delta$ coordinate frame. The magnetization current vector is then transformed into the d-q coordinate frame using [$e^{j\theta_S}$] coordinate frame transformation block 114. The angle used in the [$e^{j\theta_S}$] coordinate frame transformation block 114 is obtained from the Stator PLL 110. The magnetization current vector in the d-q coordinate frame is:

$$\begin{bmatrix} i_{md} \\ i_{mq} \end{bmatrix} = \begin{bmatrix} I_M \cos(\omega_S t + \delta_M) \\ I_M \sin(\omega_S t + \delta_M) \end{bmatrix}. \tag{11}$$

After the a-b-c to $\alpha$-$\beta$ coordinate frame transformation, the stator current vector in the d-q coordinate frame is:

$$\begin{bmatrix} i_{Sd} \\ i_{Sq} \end{bmatrix} = \begin{bmatrix} I_S^1 \cos(\omega_S t + \delta_{iS}) \\ I_S^1 \sin(\omega_S t + \delta_{iS}) \end{bmatrix}. \tag{12}$$

Combining equations (11) and (12) the stator input signal is:

$$\begin{bmatrix} i_{Sd+m} \\ i_{Sq+m} \end{bmatrix} = \begin{bmatrix} I_S^1 \cos(\omega_S t + \delta_{iS}) \\ I_S^1 \sin(\omega_S t + \delta_{iS}) \end{bmatrix} + \begin{bmatrix} I_M \cos(\omega_S t + \delta_M) \\ I_M \sin(\omega_S t + \delta_M) \end{bmatrix} \tag{13}$$

$$= \begin{bmatrix} I_S \cos(\omega_S t + \delta_S) \\ I_S \sin(\omega_S t + \delta_S) \end{bmatrix}.$$

The magnetization current vector and the stator current vector are combined in the detector 116, indicated by dashed lines in FIG. 6.

After the a-b-c to $\alpha$-$\beta$ coordinate frame transformation, the rotor current vector is:

$$\begin{bmatrix} i_{r\alpha} \\ i_{r\beta} \end{bmatrix} = \begin{bmatrix} I_r \cos(\omega_r t + \delta_{ir}) \\ I_r \sin(\omega_r t + \delta_{ir}) \end{bmatrix}. \tag{14}$$

While the stator currents are at angular frequency $\omega_S$, the rotor currents are at angular frequency $\omega_r$. The rotor current vector is processed in [$e^{j\theta_x}$] mixer 118, with $\theta_x = \omega_x t + \delta_x$. The rotor current vector is then:

$$\begin{bmatrix} i_{rd+x} \\ i_{rq+x} \end{bmatrix} = \begin{bmatrix} I_r \cos(\omega_r t + \delta_{ir} + \omega_x t + \delta_x) \\ I_r \sin(\omega_r t + \delta_{ir} + \omega_x t + \delta_x) \end{bmatrix}. \tag{15}$$

The sine and cosine components of the combined magnetization current vector and the stator current vector [$i_{Sd+m}$ $i_{Sq+m}$]$^T$—equation (13)—and the rotor current vector [$i_{rd+x}$ $i_{rq+x}$]$^T$—equation (15) are multiplied and combined in the detector 116 forming a scalar quantity based on the operation:

$$\epsilon_x = i_{Sq+m} i_{rd+x} - i_{Sd+m} i_{rq+x}. \tag{16}$$

By substituting equations (13) and (15) in equation (16) it is possible to show that $\epsilon_x = I_S I_r \sin[(\omega_S - \omega_r - \omega_x)t + (\delta_S - \delta_r - \delta_x)]$.

The error $\epsilon_x$, after processing in Proportional-Integral (P-I) block 120, yields the signal $\Delta\omega_x$. P-I blocks comprise two branches. A first branch has a proportionality constant Kp, and a second branch has an integrator (1/S) followed by an integral constant Ki. The two branches are "summed" providing as output signal: Kp+Ki(1/S) times the input signal. It is noted that P-I processing is known in the art.

Using adder 122, a central frequency $\omega_0$ received, for example, from an oscillator is added to the signal $\Delta\omega_x$ resulting in an estimate of the rotor angular frequency $\omega_x = \omega_0 + \Delta\omega_x$. The central frequency $\omega_0$ is, for example, determined to be in proximity to the stator angular frequency $\omega_s$. The estimate of the rotor angular frequency $\omega_x$ is then integrated in integrator 124 for determining a rotor position estimate $\theta_x = \omega_x t + \delta_x$, where $\delta_x$ is a constant of integration. The rotor position estimate $\theta_x$ is then used to determine the vector $[\cos(\omega_x t+\delta_x), \sin(\omega_x t+\delta_x)]^T$ in sin-cos block 126, which is then fed to the $[e^{j\theta_x}]$ mixer 118. For example, the position estimate $\theta_x$ is used as an address of sine and cosine Look-Up Tables which then provide the corresponding vector.

The error $\epsilon_x$ causes $\Delta\omega_x$ and $\delta_x$ to change until $(\omega_s-\omega_r-\omega_x)t+(\delta_s-\delta_r-\delta_x)=0$. When $\epsilon_x=0$, then $(\omega_s-\omega_r-\omega_x)_x)=0$ and $(\delta_s-\delta_r-\delta_x)=0$. From induction machine theory and the coordinate frame transformations follow the relationships: $(\omega_s-\omega_r-\omega_m)=0$ and $(\delta_s-\delta_r\delta_m)=0$. Therefore, $\omega_x=\omega_m$ and $\delta_x=\delta_m$, resulting in the tracking of the rotor position $\theta_x=\omega_m t+\delta_m$ by the Rotor Position PLL 100. The rotor position estimate $\theta_x\omega_m t+\delta_m$ is fed as the vector $[\cos(\omega_x t+\delta_x), \sin(\omega_x t+\delta_x)]^T$ to corresponding coordinate frame transformation blocks of a rotor-side VSC, while the estimate of the rotor angular frequency $\omega_x$ is fed to a power reference generator of the rotor-side VSC, as will be described hereinbelow. The Rotor Position PLL 100 provides tracking of the rotor position absent mechanical sensors and relies on only one machine parameter-magnetization inductance $L_m$—that is substantially constant over an extensive time period of machine operation.

Figure 8:
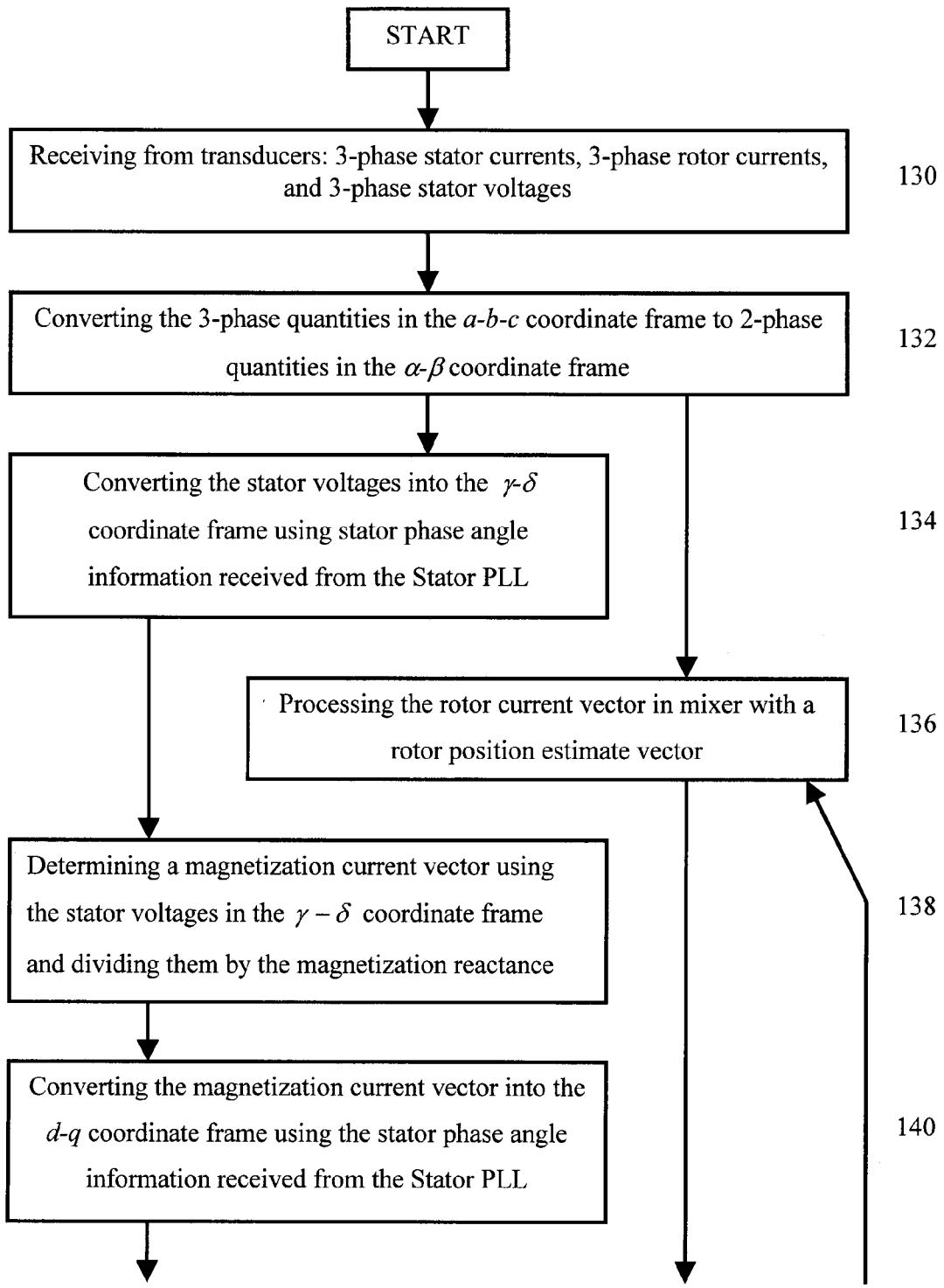
FIG. 8 is a simplified flow diagram illustrating operation of the Rotor Position PLL according to embodiments of the invention shown in FIG. 6.
Figure 8:
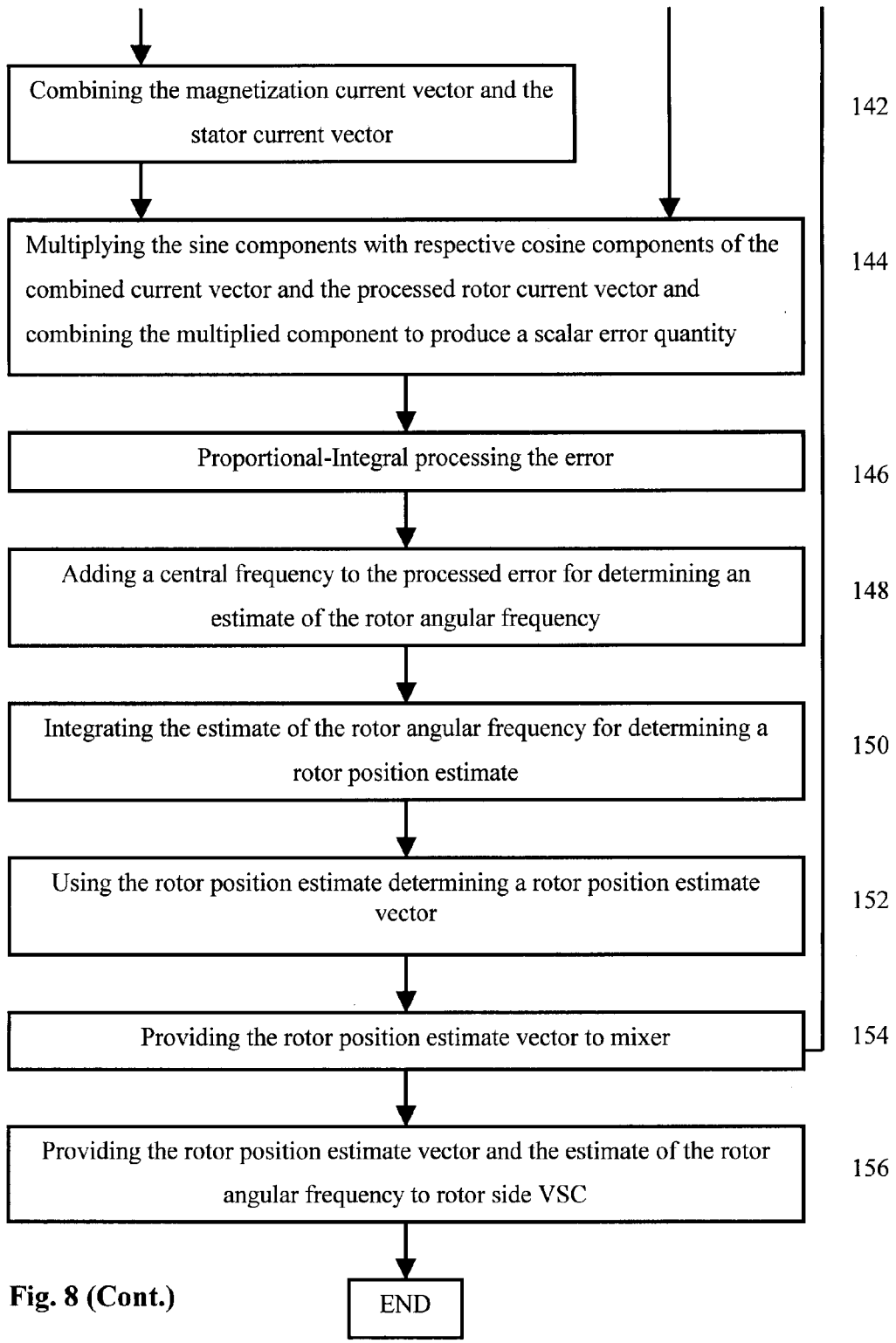

The operation of the Rotor Position PLL 100 is summarized in the simplified flow diagram illustrated in FIG. 8. At 130, signals indicative of the 3-phase stator currents, the 3-phase rotor currents, and the 3-phase stator voltages are received. The signals are then processed—at 132—to convert the 3-phase quantities in the a-b-c coordinate frame to 2-phase quantities in the $\alpha$-$\beta$ coordinate frame, i.e. a stator voltage vector, a stator current vector, and a rotor current vector, respectively. At 134, the stator voltages are converted into the $\gamma$-$\delta$ coordinate frame using stator phase angle information received from the Stator PLL, and—at 136—the rotor current vector is processed in a mixer with a rotor position estimate vector. At 138, a magnetization current vector is determined using the stator voltage vector in the $\gamma$-$\delta$ coordinate frame and dividing it by the magnetization reactance. The magnetization current vector is converted into the d-q coordinate frame using the stator phase angle information received from the Stator PLL—at 140—and then combined with the stator current vector—at 142. The sine component of the combined current vector is—at 144—multiplied with the respective cosine component of the processed rotor current vector—and vice versa—and the multiplied components are then combined to produce a scalar error quantity. The error quantity is then—at 146—processed using a Proportional-Integral process and—at 148—an estimate of the rotor angular frequency is determined by adding a central frequency to the processed error quantity. At 150, a rotor position estimate is determined by integrating the estimate of the rotor angular frequency, and—at 152—a rotor position estimate vector is determined using the rotor position estimate. The rotor position estimate vector is—at 154—provided to the mixer—used in step 136—and—at 156—provided together with the estimate of the rotor angular frequency to respective components of the rotor side VSC.

Figure 9:
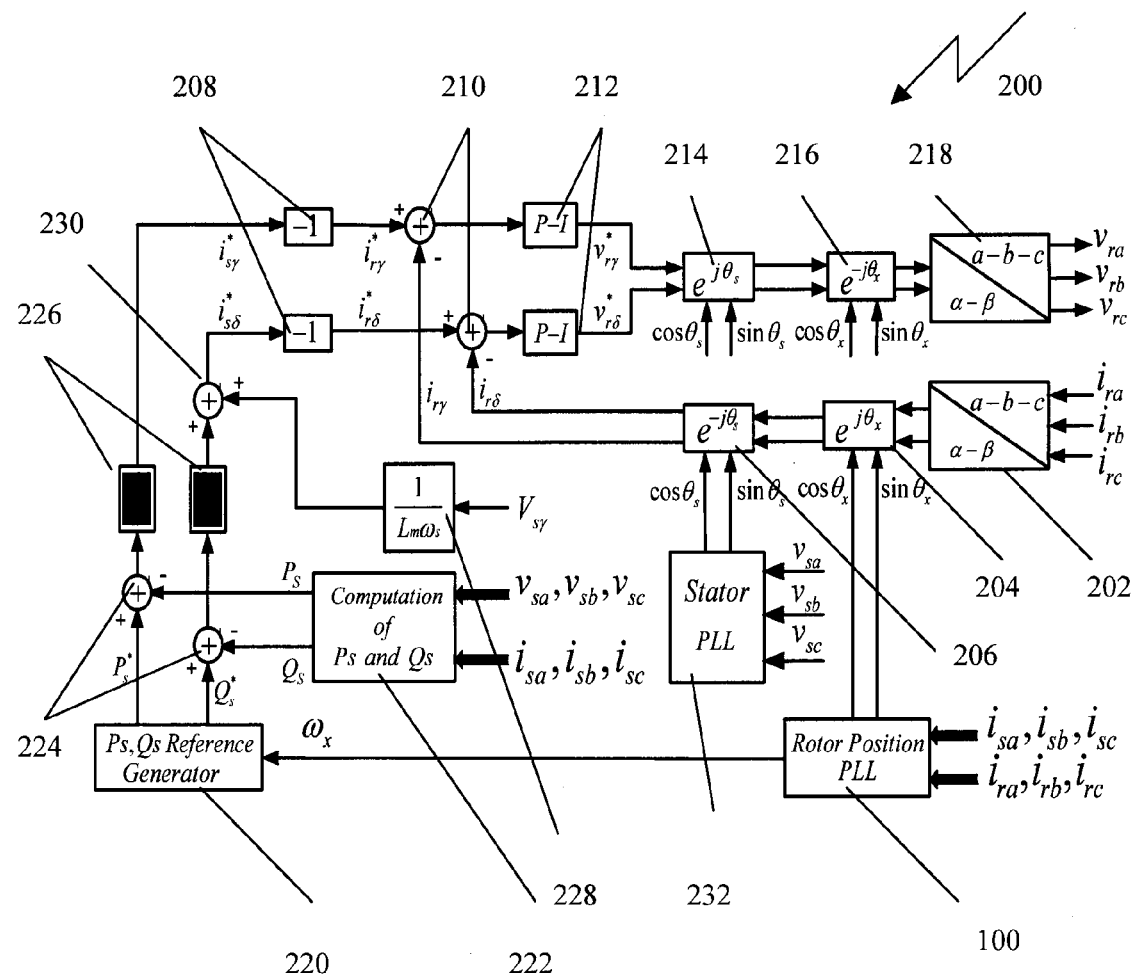
FIG. 9 is a simplified block diagram of a first embodiment of a rotor side VSC control according to embodiments of the invention.

Referring to FIG. 9, a simplified block diagram of a first embodiment of a rotor side VSC control 200 according to an embodiment of the invention is shown. The rotor currents ($i_{ra}$, $i_{rb}$, $i_{rc}$) received at rotor frequency from a current transducer, not shown, are first converted into the $\alpha$-$\beta$ coordinate frame followed by subsequent $e^{-j\theta_S}$ and $e^{+j\theta_m}$ conversion into $i_{r\gamma}$, $i_{r\delta}$ in the $\gamma$-$\delta$ coordinate frame using subsequent coordinate frame transformation blocks 202, 204, and 206, respectively. The currents $i_{r\gamma}$, $i_{r\delta}$ are compared with the stator reference currents $i_{S\gamma}*$ and $i_{S\delta}*$ and the current errors ($i_{r\gamma}*-i_{r\gamma}$, $i_{r\delta}*-i_{r\delta}$) in negative feedback become the control voltages $v_{S\gamma}*$ and $v_{r\gamma}*$ using negative sign blocks 208, adders 210, and P-I blocks 212. The control voltages $v_{S\gamma}*$ and $v_{r\delta}*$ are then converted back to ($v_{ra}$, $v_{rb}$, $v_{rc}$) in the a-b-c coordinate frame using subsequent $e^{j\theta_S}$, $e^{-j\theta_m}$ and $\alpha$-$\beta$ to a-b-c coordinate transformation in subsequent coordinate frame transformation blocks 214, 216, and 218, respectively. The control voltages ($v_{ra}$, $v_{rb}$, $v_{rc}$) are then used as 3-phase modulating signals to control the rotor side VSC using, for example, Sinusoidal Pulse Width Modulation (SPWM).

The Rotor Position PLL 100 provides the rotor position estimate vector $[\cos(\omega_x t+\delta_x), \sin(\omega_x t+\delta_x)]^T$ to the coordinate frame transformation blocks 204 and 216 and the estimate of the rotor angular frequency $\omega_x$ to $P_S$, $Q_S$ reference generator 220. For example, the rotor angular frequency $\omega_x$ is provided as address to a Look-Up table to issue corresponding complex reference powers $P_S*$, $Q_S*$. The complex reference powers $P_S*$, $Q_S*$ are compared with complex powers $P_S$, $Q_S$-determined from the measured stator voltages and the measured stator currents in power calculation block 222—using adders 224 producing power errors, which are then processed in P-I blocks 226. Processing in the P-I blocks 226 produces respective stator reference currents $i_{S\gamma}*$, $i_{S\delta}*$, with $i_{S\gamma}*=P_S*/v_{S\gamma}$ and $i_{S\delta}*=Q_S*/v_{S\gamma}$. Since the control 200 controls the rotor side of the DFIG, the magnetization current—determined in magnetization reactance block 228 using the measured stator voltage $[v_{s\gamma} 0]^T$ and magnetization inductance $L_m$—is subtracted from the stator reference currents $i_{S\gamma}*$, $i_{S\delta}*$ using adder 230 and become—after processing in the negative sign blocks 208—the control reference currents $i_{r\gamma}*$, $i_{r\delta}*$. The angle used in the $[e^{j\theta_S}]$ coordinate frame transformation blocks 214 and 206, respectively, is provided by the Stator PLL 232 as vector of reference angles $[\cos(\omega_S t), \sin(\omega_S t)]^T$.

The operation of the rotor side VSC control 200 is summarized in the simplified flow diagram illustrated in FIG. 10. At 240, signals indicative of the 3-phase rotor currents at rotor frequency are received. The signals are then processed—at 242—to subsequently convert the 3-phase rotor currents from the a-b-c coordinate frame into the $\gamma$-$\delta$ coordinate frame using the rotor position estimate vector provided by the Rotor Position PLL and the stator phase angle information received from the Stator PLL. At 244, 3-phase stator voltages and 3-phase stator currents are received and complex powers $P_S$, $Q_S$ are determined in dependence thereupon. Using the estimate of the rotor angular frequency $\omega_x$ provided by the Rotor Position PLL complex reference powers $P_S*$, $Q_S*$ are determined—at 246. The complex reference powers $P_S*$, $Q_S*$ are compared with the complex powers $P_S$, $Q_S$ producing respective power errors and the power errors are then processed in respective P-I processing blocks producing respective stator reference currents—at 248. At 250, a magnetization current is determined and subtracted from the stator reference currents. The stator reference currents are then compared with the rotor currents in negative feedback using negative sign blocks, adders, and P-I blocks producing control voltages—at 252. At 254, the control voltages are subsequently converted from the γ-δ coordinate frame into the a-b-c coordinate frame using the stator phase angle information received from the Stator PLL and the rotor position estimate vector provided by the Rotor Position PLL. After the conversion, the control voltages are provided as 3-phase modulating signals—at 256.

Figure 11:
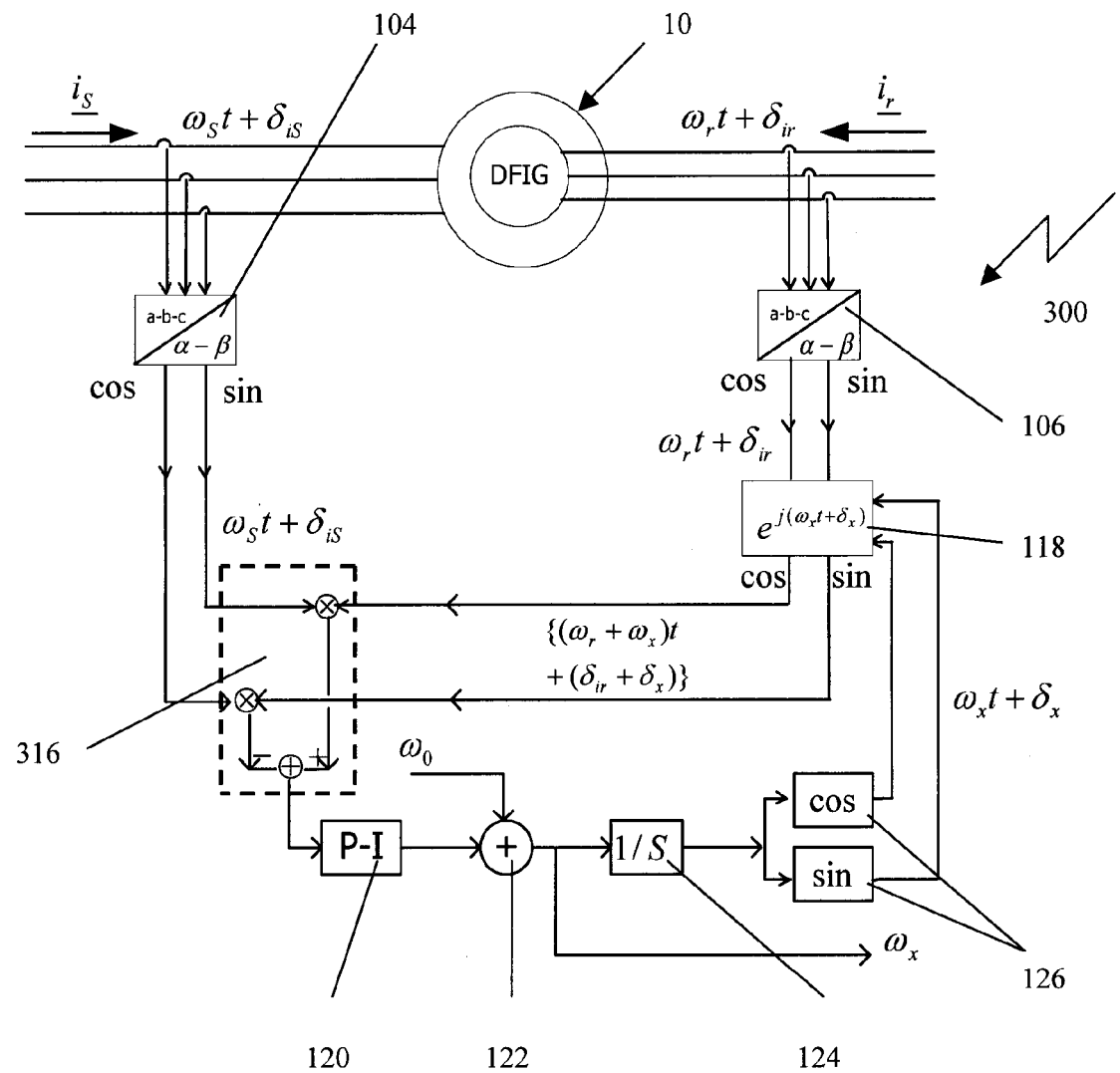
FIG. 11 is a simplified block diagram of a second embodiment of a Rotor Position PLL system according to embodiments of the invention.

Referring to FIG. 11, a simplified block diagram of a second embodiment of a Rotor Position PLL system 300 according to embodiments of the invention is shown. The Rotor Position PLL 300 is similar in structure and function to the Rotor Position PLL 100, but is of simpler design at the cost reduced accuracy. However, the accuracy of the Rotor Position PLL 300 is still sufficient for numerous applications. The Rotor Position PLL 300 provides tracking of the rotor position absent mechanical sensors and does not rely on a machine parameter. It is noted, that in the description of the Rotor Position PLL 300 hereinbelow same reference numerals are used for same components performing a same function as in the description of the Rotor Position PLL 100.

The Rotor Position PLL system 300 receives from transducers signals indicative of the 3-phase stator currents and the 3-phase rotor currents. Typically, the transducers are for converting the rotor currents into transducer signals. The 3-phase a-b-c quantities are converted to 2-phase α-β quantities in coordinate frame transformation blocks 104, and 106 for the stator currents and the rotor currents, respectively. FIG. 11 depicts 2-phase information channels with cos(..) and sin(..) symbols under the transformation blocks denoting the channels containing the cosine and the sine of arguments. The arguments are the angles $\theta_S=\omega_S t+\delta_S$, and $\theta_r=\omega_r t+\delta_r$ for the channels of blocks 104 and 106, respectively.

As above, the operation of the Rotor Position PLL 300 is based on the same principle as the Stator PLL described above with the algebraic unknown ($\omega_x t+\delta_x$) being added to the rotor current angle ($\omega_{ir} t+\delta_{ir}$) such that the angle [($\omega_{ir}+\omega_x)t+\delta_{ir}+\delta_x$)] tracks the angle ($\omega_S t+\delta_S$) of the stator currents. On convergence, ($\omega_x t+\delta_x$) yields the angle of rotation of the rotor, which is $\theta_m=\omega_m t+\delta_m$.

While the stator currents are at angular frequency $\omega_S$, the rotor currents are at angular frequency $\omega_r$. The rotor current vector is then processed in $[e^{j\theta_x}]$ mixer 118, with $\theta_x=\omega_x t+\delta_x$. The sine and cosine components of the stator current vector are multiplied and combined in the detector 316 forming a scalar error quantity $\epsilon_x$. The error quantity $\epsilon_x$, after processing in Proportional-Integral (P-I) block 120, yields the signal $\Delta\omega_x$. Using adder 122, a central frequency $\omega_0$ received, for example, from an oscillator, is added to the signal $\Delta\omega_x$ resulting in an estimate of the rotor angular frequency $\omega_x=\omega_0+\Delta\omega_x$. The central frequency $\omega_0$ is, for example, determined to be in proximity to the stator angular frequency $\omega_s$. The estimate of the rotor angular frequency $\omega_x$ is then integrated in integrator 124 for determining a rotor position estimate $\theta_x=\omega_x t+\delta_x$, where $\delta_x$ is a constant of integration. The rotor position estimate $\theta_x$ is then used to determine the vector $[\cos(\omega_x t+\delta_x), \sin(\omega_x t+\delta_x)]^T$ in sin-cos block 126, which is then fed to the $[e^{j\theta_x}]$ mixer 118. For example, the position estimate $\theta_x$ is used as an address of sine and cosine Look-Up Tables which then provide the corresponding vector.

Figure 12:
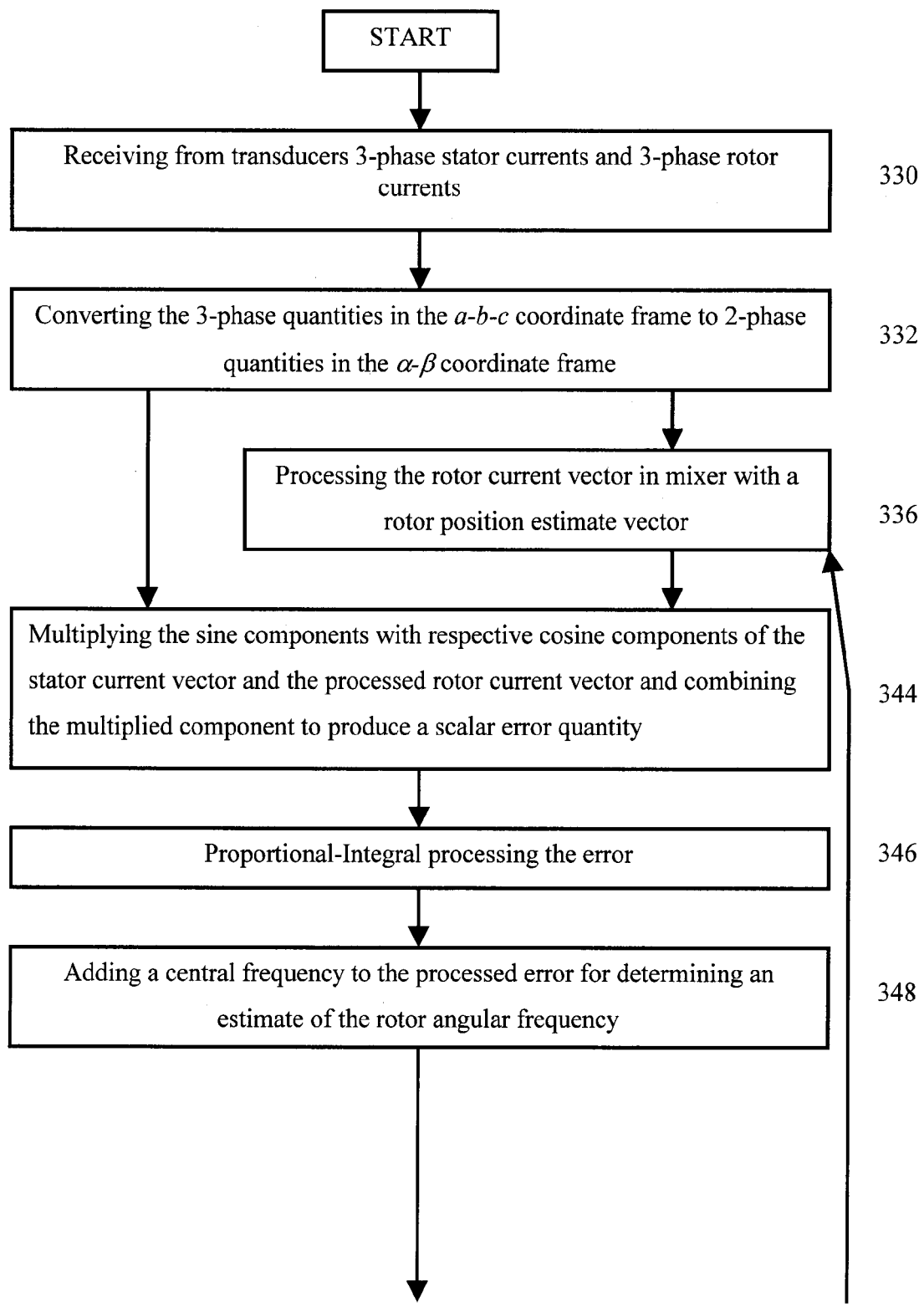
FIG. 12 is a simplified flow diagram illustrating operation of the Rotor Position PLL according to the invention according to embodiments of the invention shown in FIG. 11.
Figure 12:
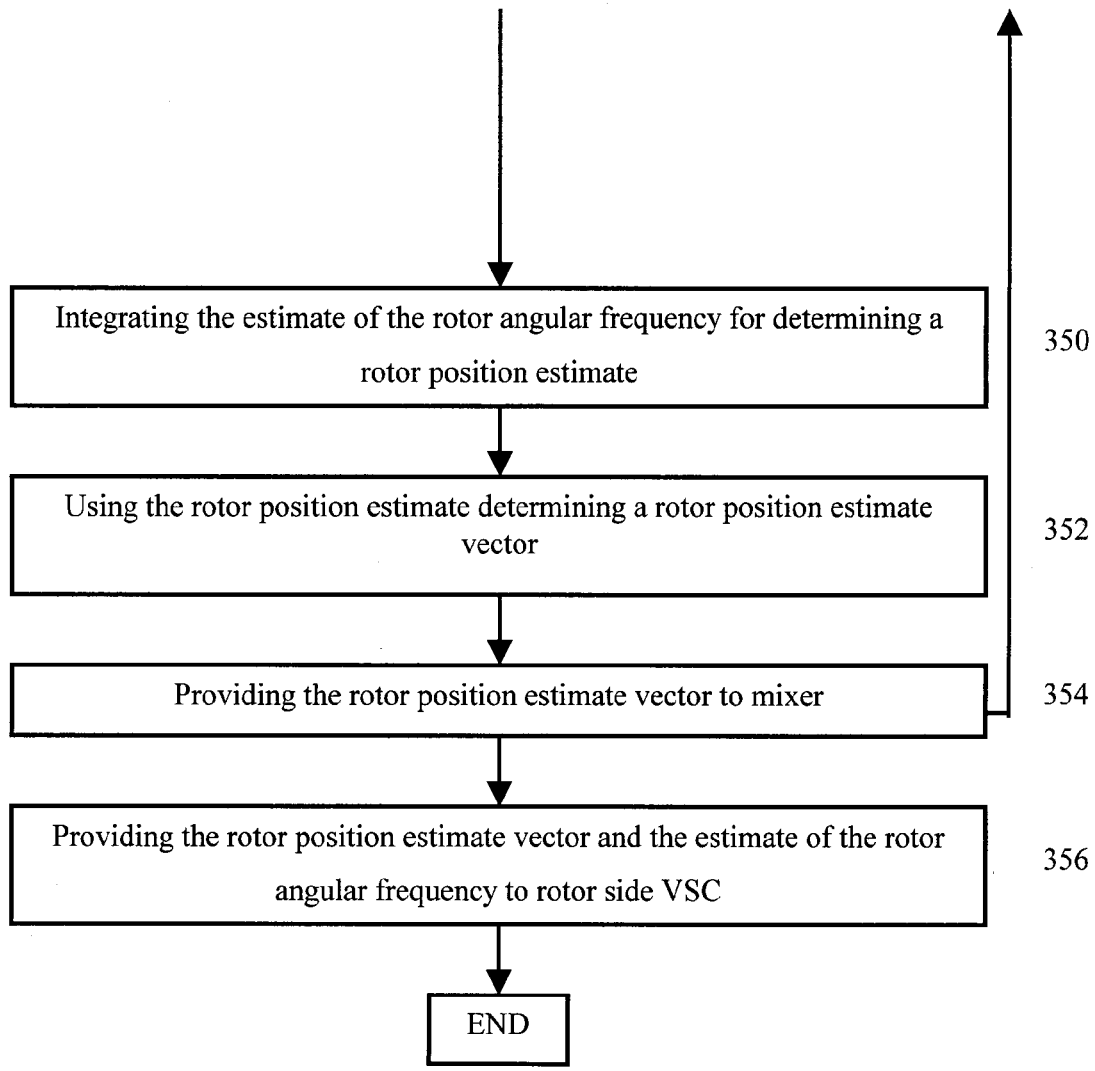

The operation of the Rotor Position PLL 300 is summarized in the simplified flow diagram illustrated in FIG. 12. At 330, signals indicative of the 3-phase stator currents and the 3-phase rotor currents are received. The signals are then processed—at 332—to convert the 3-phase quantities in the a-b-c coordinate frame to 2-phase quantities in the α-β coordinate frame, i.e. a stator voltage vector, a stator current vector, and a rotor current vector, respectively. At 336, the rotor current vector is processed in a mixer with a rotor position estimate vector. The sine component of the stator current vector is—at 344—multiplied with the respective cosine component of the processed rotor current vector—and vice versa—and the multiplied components are then combined to produce a scalar error quantity. The error quantity is then—at 346—processed using a Proportional-Integral process and—at 348—an estimate of the rotor angular frequency is determined by adding a central frequency to the processed error quantity. At 350, a rotor position estimate is determined by integrating the estimate of the rotor angular frequency, and—at 352—a rotor position estimate vector is determined using the rotor position estimate. The rotor position estimate vector is—at 354—provided to the mixer—used in step 336—and—at 356—provided together with the estimate of the rotor angular frequency to respective components of the rotor side VSC.

Figure 13:
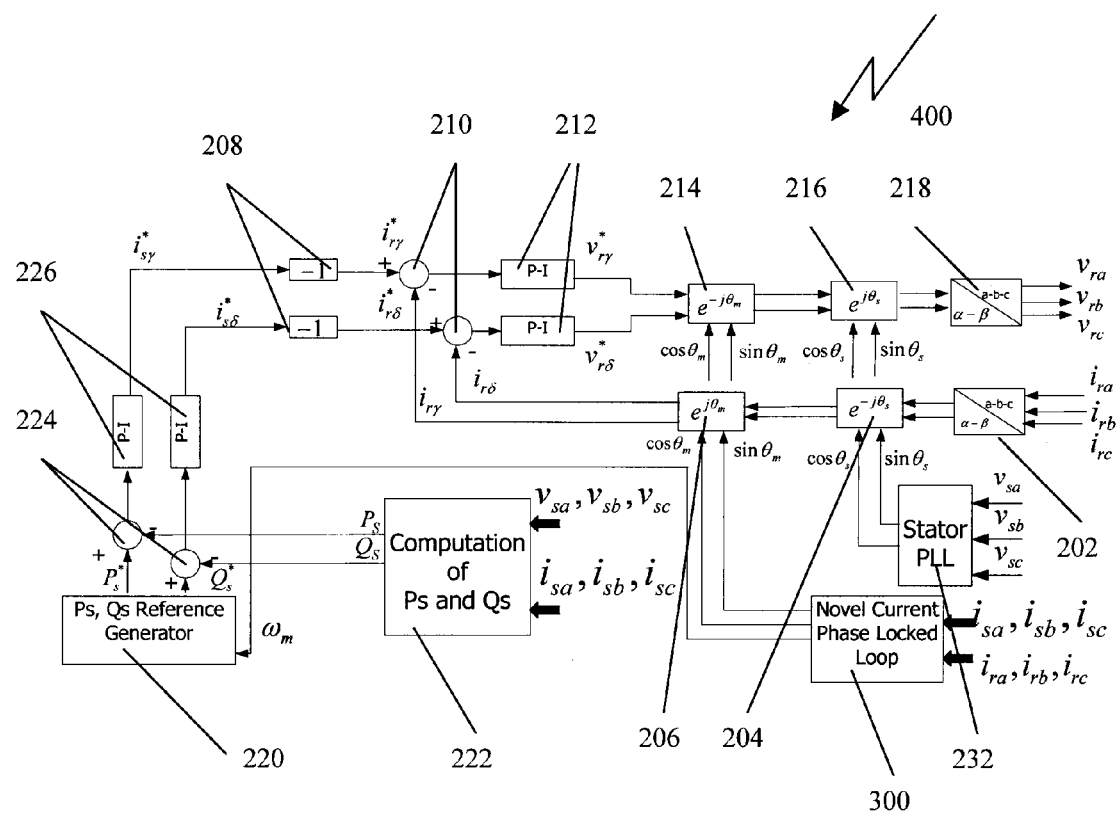
FIG. 13 is a simplified block diagram of a second embodiment of a rotor side VSC control according to embodiments of the invention.

Referring to FIG. 13, a simplified block diagram of a second embodiment of a rotor side VSC control 400 according to embodiments of the invention is shown. The rotor side VSC control 400 is similar in structure and function to the rotor side VSC control 200, but is of simpler design. It is noted, that in the description of the rotor side VSC control 400 hereinbelow same reference numerals are used for same components performing a same function as in the description of the rotor side VSC control 200. The rotor currents ($i_{ra}, i_{rb}, i_{rc}$) received at rotor frequency from a current transducer, not shown, are first converted into the α-β coordinate frame followed by subsequent $e^{-j\theta_S}$ and $e^{+j\theta_m}$ conversion into $i_{r\gamma}, i_{r\delta}$ in the γ-δ coordinate frame using subsequent coordinate frame transformation blocks 202, 204, and 206, respectively. The currents $i_{r\gamma}, i_{r\delta}$ are compared with the stator reference currents $i_{S\gamma}^*$ and $i_{S\delta}^*$ and the current errors ($i_{r\gamma}^*-i_{r\gamma}$, $i_{r\delta}^*-i_{r\delta}$) in negative feedback become the control voltages $v_{S\gamma}^*$ and $v_{r\delta}^*$ using negative sign blocks 208, adders 210, and P-I blocks 212. The control voltages $v_{S\gamma}^*$ and $v_{r\delta}^*$ are then converted back to ($v_{ra}, v_{rb}, v_{rc}$) in the a-b-c coordinate frame using subsequent $e^{-j\theta_m}$, $e^{j\theta_S}$, and α-β to a-b-c coordinate transformation in subsequent coordinate frame transformation blocks 214, 216, and 218, respectively. The control voltages ($v_{ra}, v_{rb}, v_{rc}$) are then used as 3-phase modulating signals to control the rotor side VSC using, for example, Sinusoidal Pulse Width Modulation (SPWM).

The Rotor Position PLL 300 provides the rotor position estimate vector $[\cos(\omega_x t+\delta_x), \sin(\omega_x t+\delta_x)]^T$ to the coordinate frame transformation blocks 206 and 214 and the estimate of the rotor angular frequency $\omega_x$ to $P_S$, $Q_S$ reference generator 220. For example, the rotor angular frequency $\omega_x$ is provided as address to a Look-Up table to issue corresponding complex reference powers $P_S^*, Q_S^*$. The complex reference powers $P_S^*, Q_S^*$ are compared with complex powers $P_S, Q_S$-determined from the measured stator voltages and the measured stator currents in power calculation block 222—using adders 224 producing power errors, which are then processed in P-I blocks 226. Processing in the P-I blocks 226 produces respective stator reference currents $i_{S\gamma}^*, i_{S\delta}^*$, with $i_{S\gamma}^*=P_S^*/v_{S\gamma}$ and $i_{S\delta}^*=Q_S^*/v_{S\gamma}$, which become—after processing in the negative sign blocks 208—the control reference currents $i_{r\gamma}^*, i_{r\delta}^*$. The angle used in the $[e^{j\theta_S}]$ and $[e^{-j\theta_S}]$ coordinate frame transformation blocks 214 and 206, respectively, is provided by the Stator PLL 232 as vector of reference angles $[\cos(\omega_S t), \sin(\omega_S t)]^T$.

Figure 14:
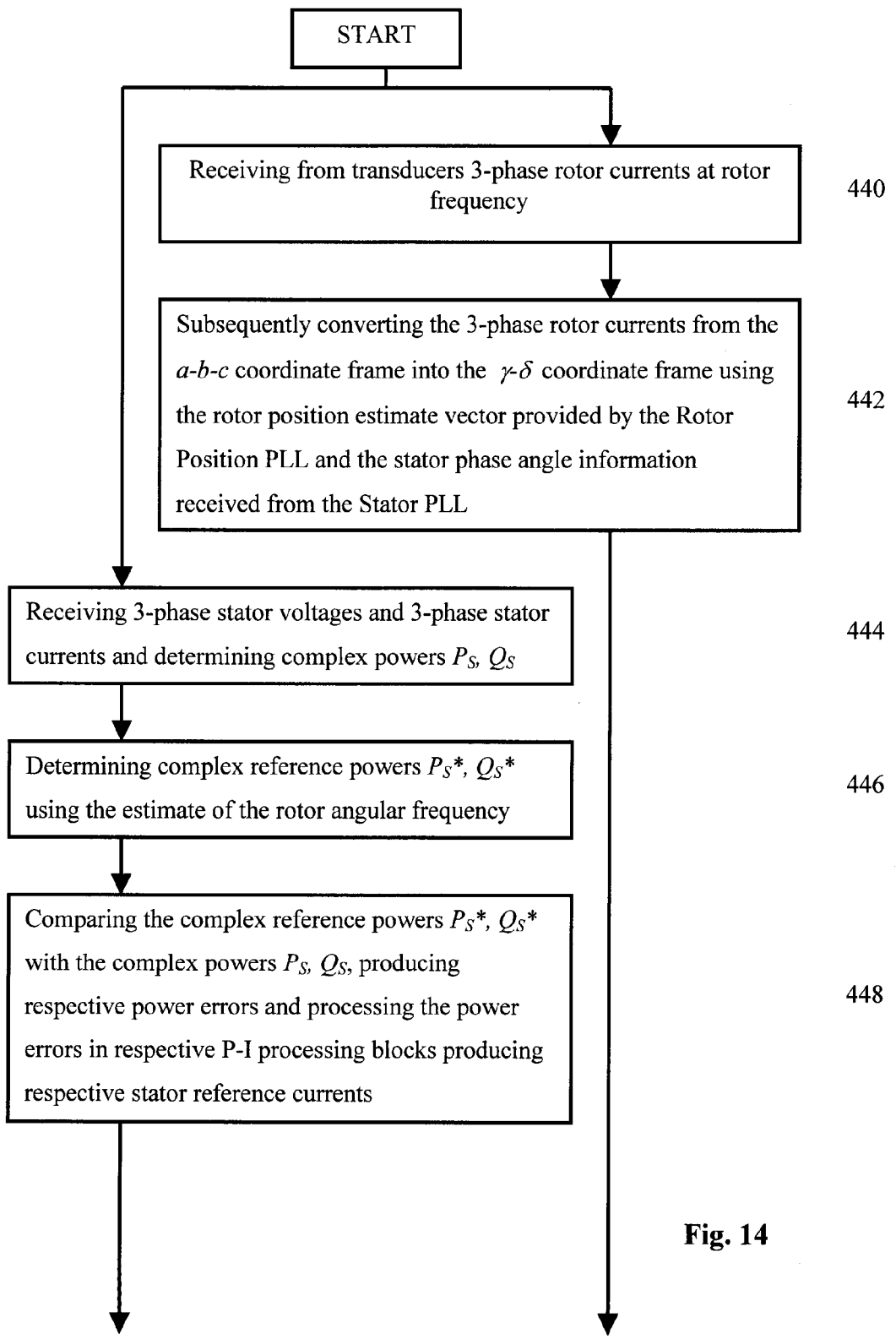
FIG. 14 is a simplified flow diagram illustrating operation of the rotor side VSC control according to embodiments of the invention shown in FIG. 13.
Figure 14:
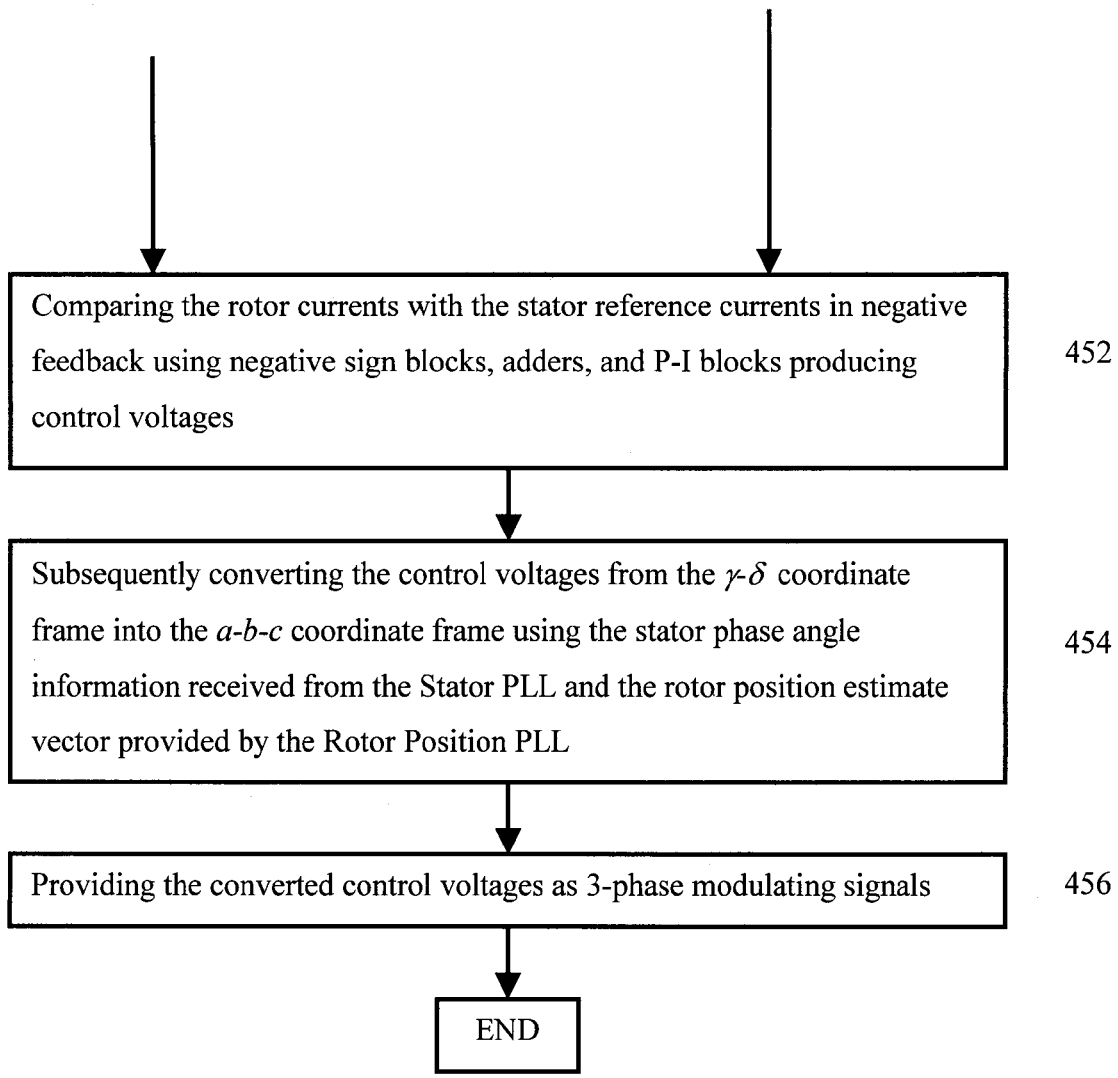

The operation of the rotor side VSC control 400 is summarized in the simplified flow diagram illustrated in FIG. 14. At 440, signals indicative of the 3-phase rotor currents at rotor frequency are received. The signals are then processed—at 442—to subsequently convert the 3-phase rotor currents from the a-b-c coordinate frame into the γ-δ coordinate frame using the rotor position estimate vector provided by the Rotor Position PLL and the stator phase angle information received from the Stator PLL. At 444, 3-phase stator voltages and 3-phase stator currents are received and complex powers $P_S$, $Q_S$ are determined in dependence thereupon. Using the estimate of the rotor angular frequency $\omega_x$ provided by the Rotor Position PLL complex reference powers $P_{S^*}$, $Q_S^*$ are determined—at 446. The complex reference powers $P_S^*$, $Q_S^*$ are compared with the complex powers $P_S$, $Q_S$ producing respective power errors and the power errors are then processed in respective P-I processing blocks producing respective stator reference currents—at 448. The stator reference currents are then compared with the rotor currents in negative feedback using negative sign blocks, adders, and P-I blocks producing control voltages—at 452. At 454, the control voltages are subsequently converted from the γ-δ coordinate frame into the a-b-c coordinate frame using the stator phase angle information received from the Stator PLL and the rotor position estimate vector provided by the Rotor Position PLL. After the conversion, the control voltages are provided as 3-phase modulating signals—at 456.

Figure 15:
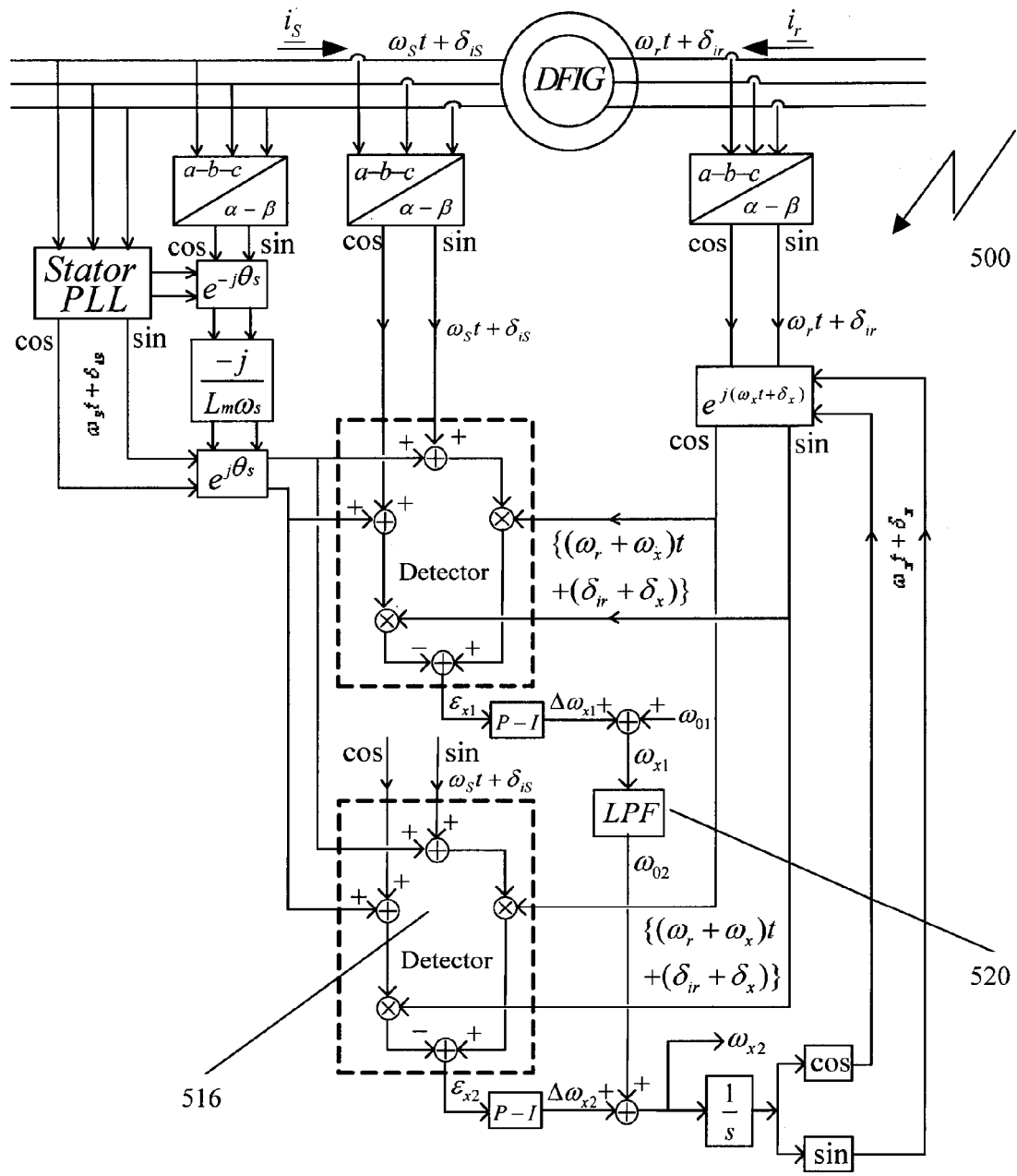
FIG. 15 is a simplified block diagram of a third embodiment of a Rotor Position PLL system according to embodiments of the invention.

Referring to FIG. 15, a simplified block diagram of a third embodiment of a Rotor Position PLL system 500 according to embodiments of the invention is shown. Noise in the position estimate δ is reduced first by the P-I block after $\epsilon_x$—the output of the detector—and then by the [1/jω] integrator block 124, which converts frequency $\omega_x$ to angle $\delta_x$. Reduction of noise requires a small proportional gain $K_p$. However, it is not possible to reduce $K_p$ beyond a certain value without instability because of the large frequency range—$0.3\omega_0 < \Delta\omega_X < 0.3\omega_0$—within in which $\Delta\omega_X$ varies. This range is due to the operation of the DFIG within ±0.3 slip. In order to reduce the range of frequency tracking, a double PLL design is used. The Rotor Position PLL system 500 comprises the same components as the Rotor Position PLL 100 but additionally a second PLL—detector 516. The upper PLL—detector 116 has a fixed center frequency at 60 Hz, i.e. $\omega_{01} = 120\pi$. This PLL serves to track the wide range of operating frequency $(1-0.3) \times 120\pi < \omega_{X1} < (1+0.3) \times 120\pi$. The proportional gain $K_{p1}$ and the integral gain $K_{I1}$ are chosen to assure successful tracking over the extensive frequency range. The output angular frequency $\omega_{X1}$ of the first PLL—after having its fluctuations removed by a Low Pass Filter (LPF) 520—becomes the center frequency of the second PLL, i.e. $\omega_{02} = \omega_{X1}$. With respect to the second PLL, since its center frequency, $\omega_{02} = \omega_{X1}$, is close to the objective of tracking, the range of its frequency deviation $\Delta\omega_{X2}$ is small. Therefore, the proportional gain $K_{p2}$ and the integral gain $K_{j2}$ are chosen to reduce the noise in $\omega_{X2}$ and $\delta_{X2}$ without causing instability. The Rotor Position PLL system 500 is incorporated into the rotor side VSC control 400 in a same fashion as the Rotor Position PLL system 100. Of course, it is possible to incorporate the double PLL design in the Rotor Position PLL system 300 in a similar fashion.

As is evident to those skilled in the art, the various embodiments of the Rotor Position PLL and the rotor side VSC control according to embodiments of the invention are—while described herein in combination with the rotor side control of a doubly-fed induction generator only, for the sake of simplicity—easily adapted for providing rotor side control doubly-fed induction motors as well as doubly-fed induction machines that combine the function of a generator and a motor in a same unit. Furthermore, one skilled in the art will appreciate that the Rotor Position PLL and the rotor side VSC control according to embodiments of the invention are easily adapted for controlling various types of 3-phase doubly-fed induction machines as well as 2-phase doubly-fed induction machines by adapting the transform to and from the α-β coordinate frame.

The Rotor Position PLL and the rotor side VSC control according to embodiments of the invention are implemented, for example, by performing analog signal processing, digital signal processing or a combination thereof using standard technologies that are well known in the art. For example, a combination of analog and digital signal processing is implemented on a System On a Chip (SoC) using, for example, standard CMOS technology. Alternatively, the signal processing is performed digitally, for example, by executing on a processor executable commands stored in a storage medium or in hardware implemented fashion using, for example, a Field Programmable Gate Array (FPGA).

The Rotor Position PLL according to embodiments of the invention provides tracking of the rotor position absent mechanical sensors and relies on only one machine parameter—magnetization inductance $L_m$—that is substantially constant over an extensive time period of machine operation, or does not rely on any machine parameter. The Rotor Position PLL according to embodiments of the invention is substantially robust as well as accurate over a wide operational range. Those skilled in the art will appreciate that it is possible to incorporate the Rotor Position PLL according to embodiments of the invention into existing control systems as a retrofit.

Figure 16:
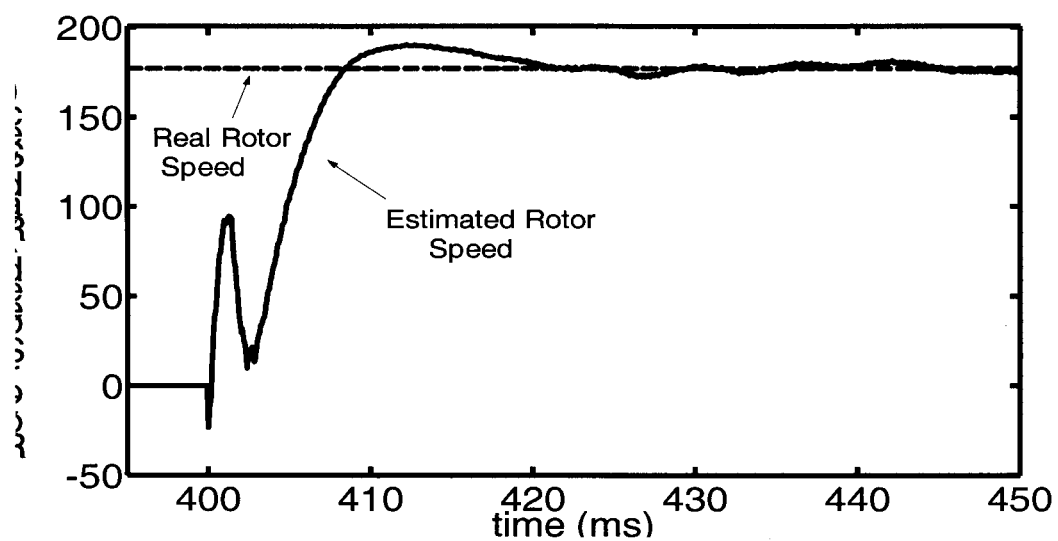
FIG. 16 is a diagram illustrating the transient response of the estimate of the rotor angular frequency $\omega_x$ provided by the Rotor Position PLL.
Figure 17A:
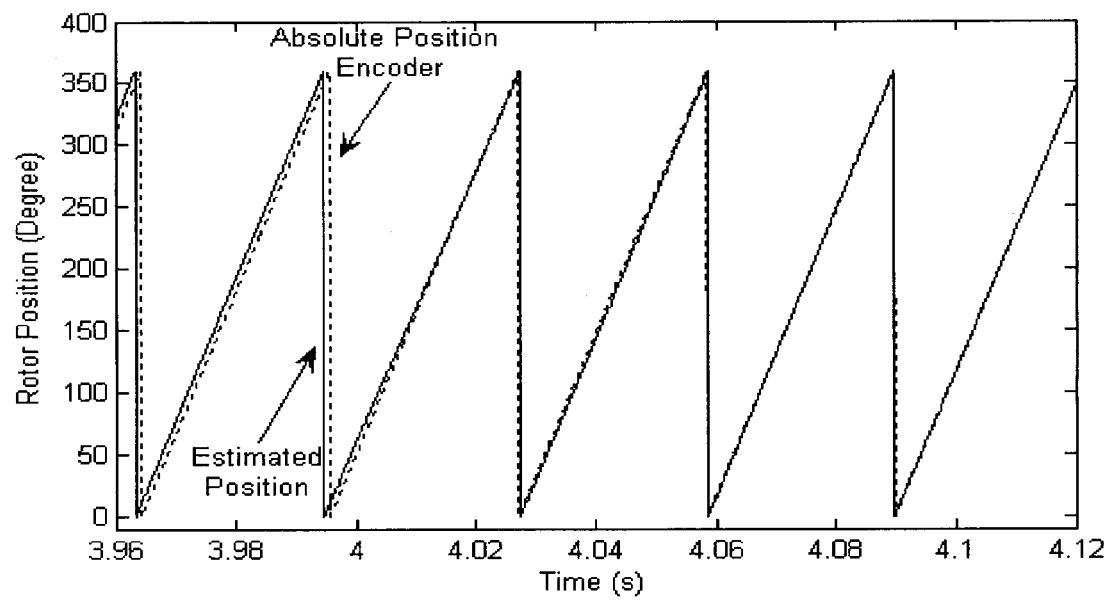
FIGS. 17a and 17b are diagrams illustrating a comparison of the angle $\delta_m$ of the rotor position with its estimate $\delta_X$ and the error $\epsilon_{position} = \delta_X - \delta_m$, respectively.
Figure 17B:
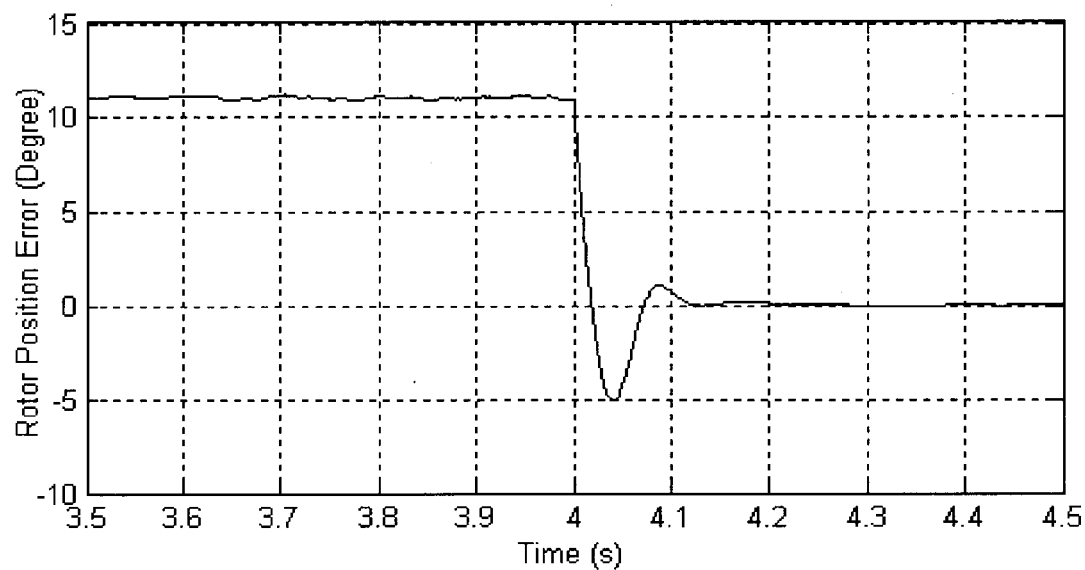
Figure 18A:
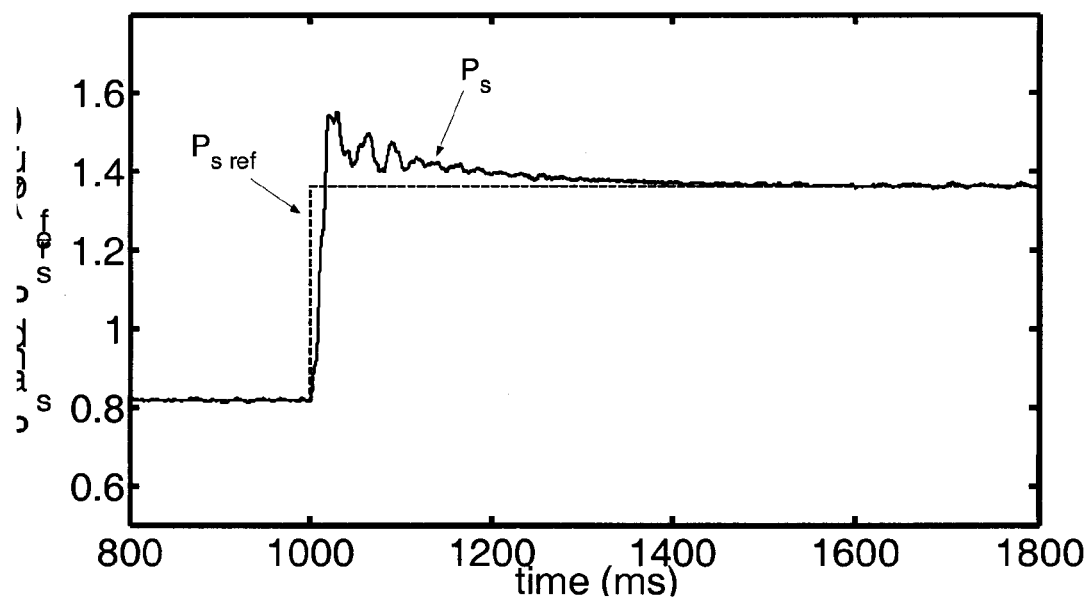
FIGS. 18a, 18b, 19a, and 19b are diagrams illustrating test results demonstrating the possibility of implementing decoupled P-Q control.
Figure 18B:
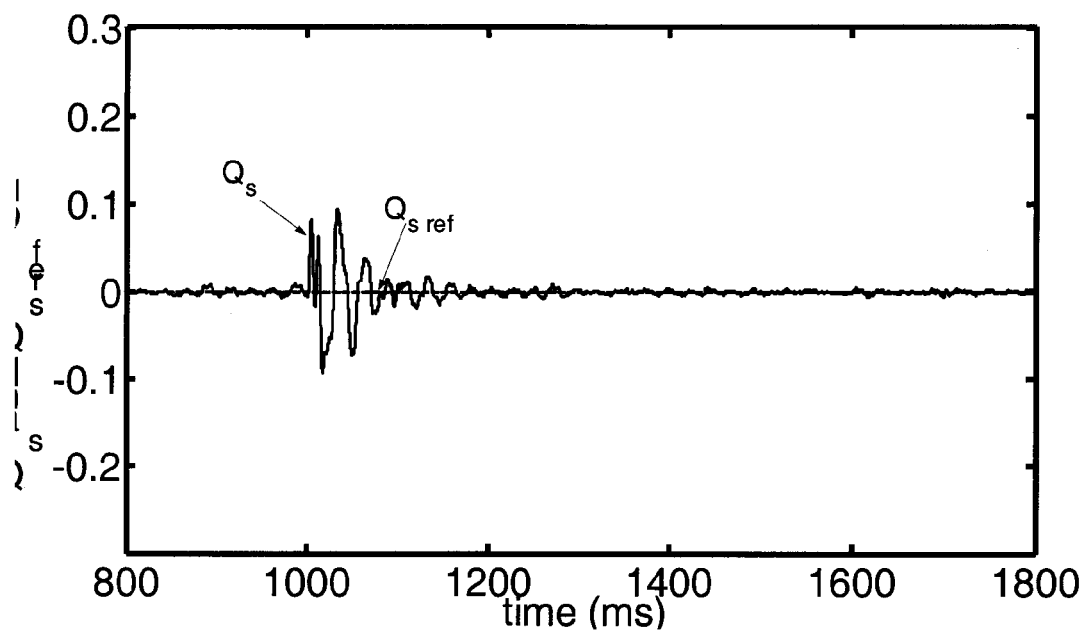
Figure 19A:
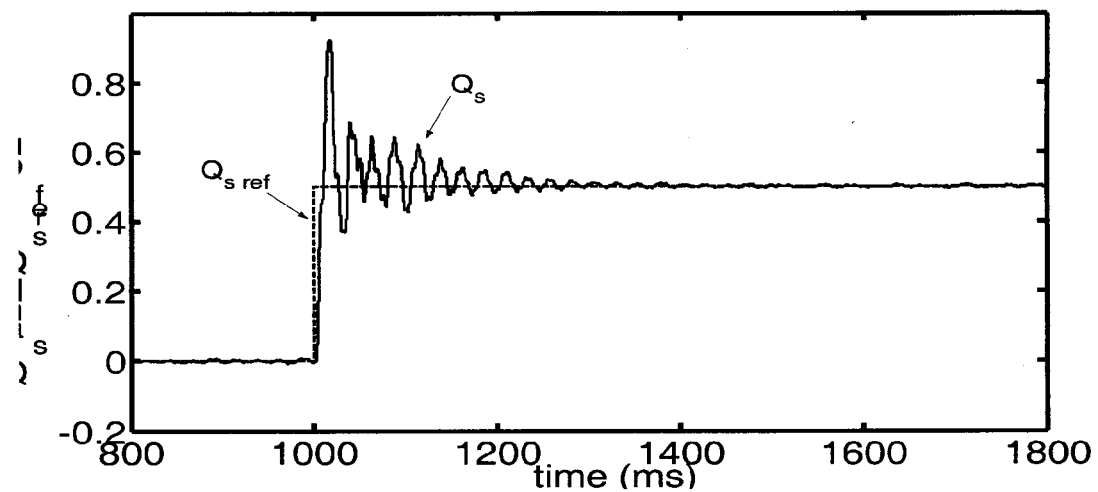
Figure 19B:
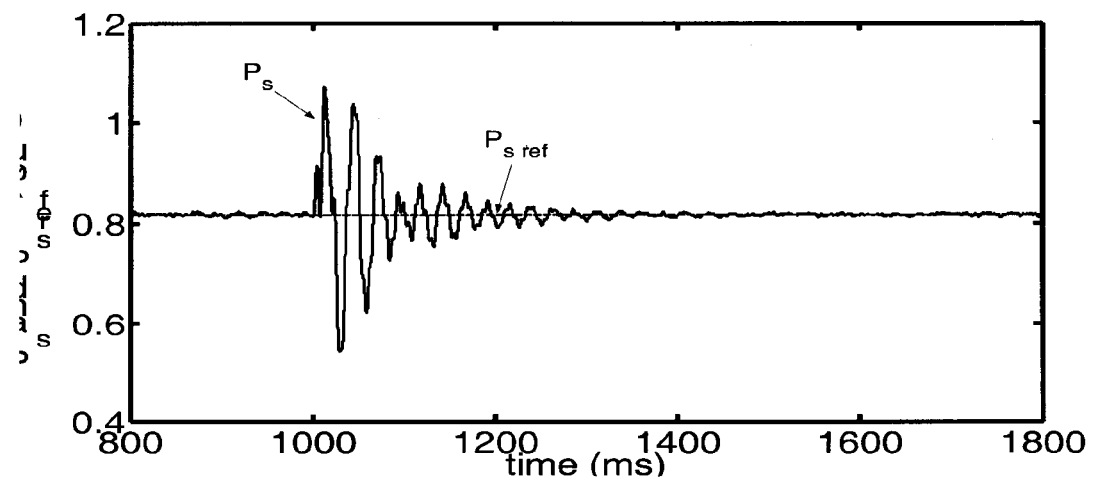
Figure 20A:
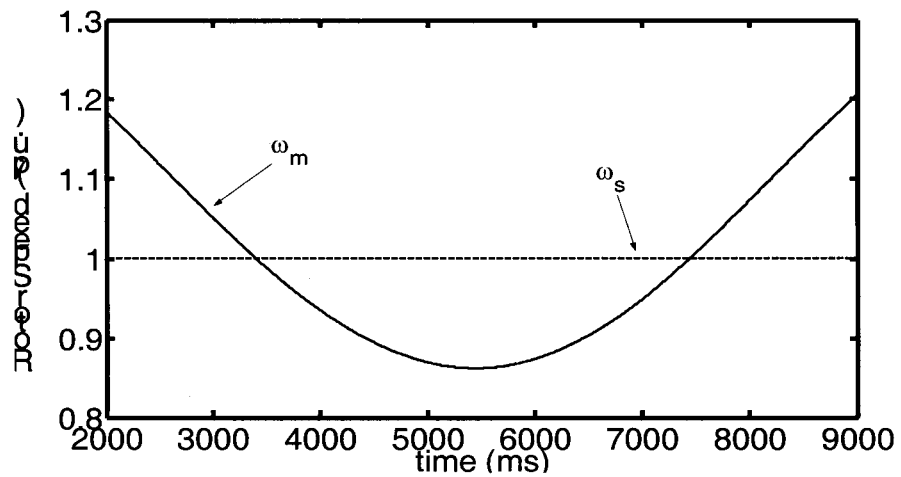
FIGS. 20a to 20c are diagrams illustrating simulation results where the DFIG is driven from super-synchronous speed to below synchronous speed and back to super-synchronous speed.
Figure 20B:
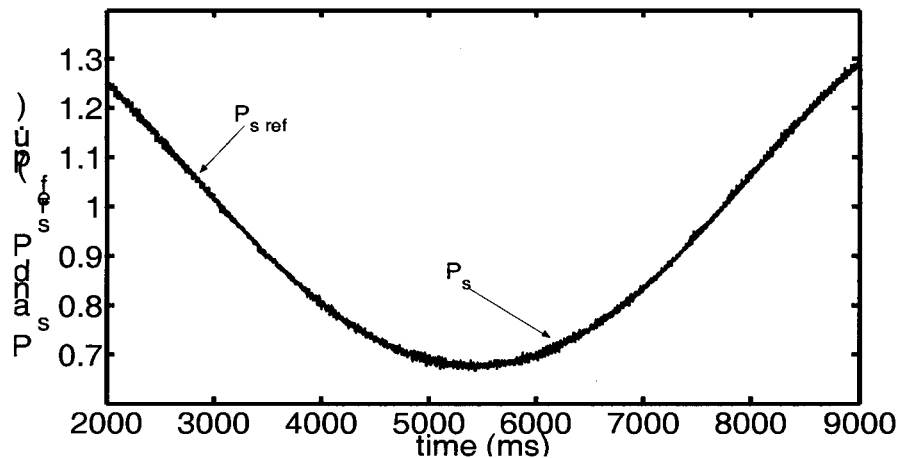
Figure 20C:
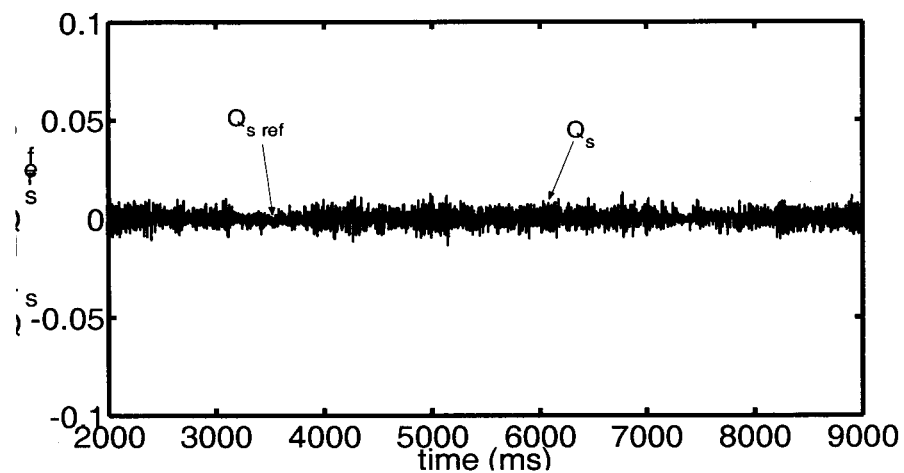
Figure 21:
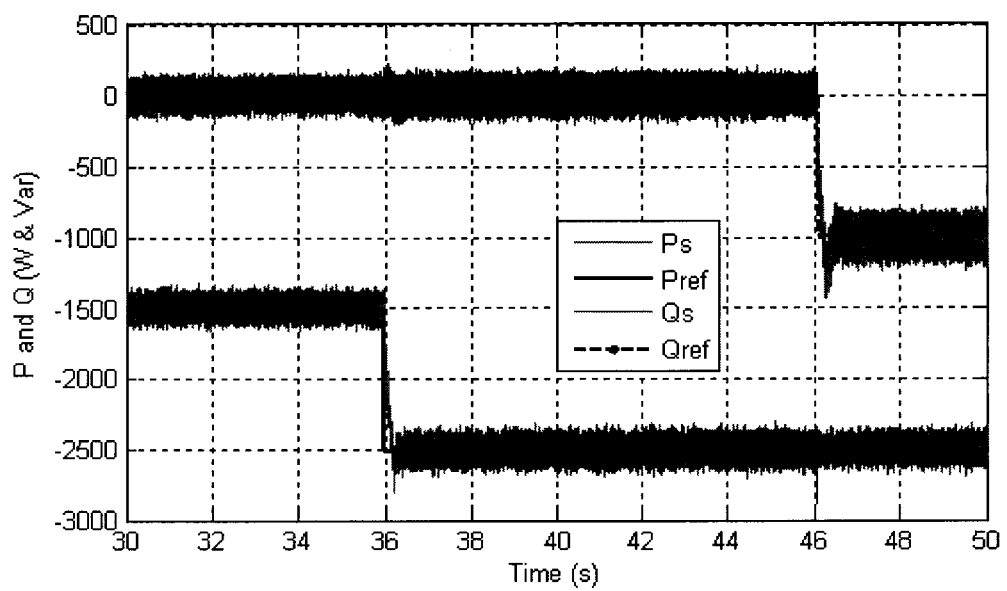
FIG. 21 is a diagram illustrating experimental results of decoupled P-Q control of the DFIG.
Figure 22:
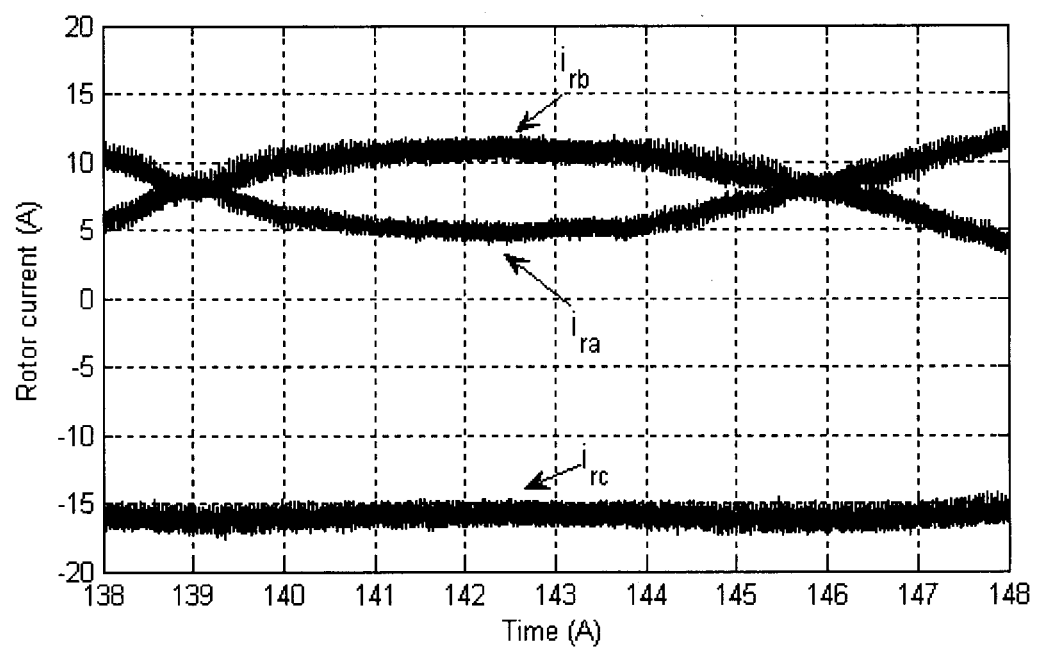
FIG. 22 is a diagram illustrating the ability of the Rotor Position PLL according to embodiments of the invention to track at synchronous speed; and, FIGS. 23a to 23c are diagrams illustrating simulation results using the double PLL of the Rotor Position PLL system according to embodiments of the invention.
Figures 23A, 23B, 23C:
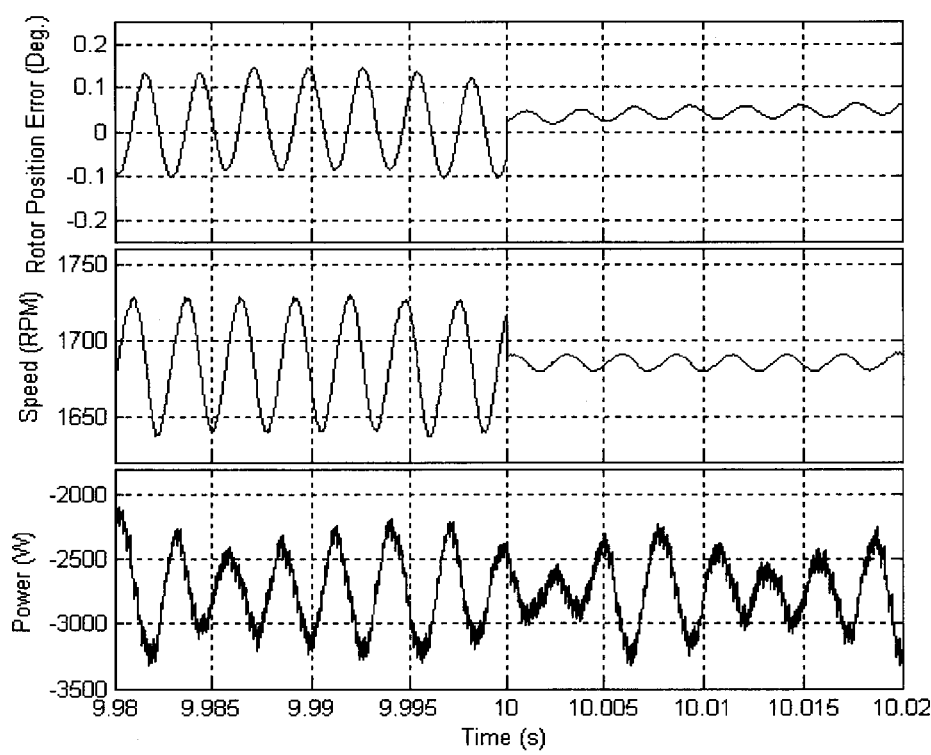

An integrated system as illustrated in FIGS. 1, 6, and 9 has been simulated using professional-grade simulation software—EMTP-RV. IGBT switching of the back-to-back VSCs with SPWM has been modeled. FIG. 16 illustrates the transient response of the estimate of the rotor angular frequency $\omega_x$ provided by the Rotor Position PLL in tracking a constant rotor angular frequency $\omega_m$. FIG. 17a compares the angle $\delta_m$ of the rotor position with its estimate $\delta_X$ in constant speed operation, while FIG. 17b illustrates the error $\epsilon_{position} = \delta_X - \delta_m$. FIGS. 18 and 19 illustrate test results demonstrating the possibility of implementing decoupled P-Q control. In FIG. 18, the real reference power of the stator, $P_{Sref}$, is given a step change while the reactive power reference of the stator, $Q_{Sref}$ is kept constant. In FIG. 19, $P_{Sref}$ is kept constant and $Q_{Sref}$ is given a step change. FIGS. 20a to 20c illustrate simulation results where the DFIG is driven from super-synchronous speed to below synchronous speed and back to super-synchronous speed. The simulation results show the rotor speed in FIG. 20a, the stator-side real power in FIG. 20b and the stator-side reactive power, which is held constant in FIG. 20c. The control of real power is based on $P_{Sref} = k_m \omega_m^3$, where the proportionality constant $k_m$ is chosen to implement optimal wind power acquisition. The results show the decoupled tracking of the P-Q references. FIG. 21 illustrates the results of an experiment in which the generated real reference power is increased from −1500 W to −2500 W while the reactive power is held constant at zero. Then while keeping the real power constant, the reactive power is changed from 0 to −1000 VAr. FIG. 22 illustrates the ability of the Rotor Position PLL according to embodiments of the invention to track at synchronous speed by showing the experimental measurement of the 3-phase rotor currents for a 10 second duration where the speed is held synchronous. FIGS. 23a to 23c illustrate simulation results using the double PLL of the Rotor Position PLL system 500. FIG. 23a illustrates the position error $\epsilon_{position} = \delta_X - \gamma_m$, where $\delta_m$ is obtained from the position encoder of the simulation software; FIG. 23b the angular frequency estimate $\omega_X$; and FIG. 23c the stator-side power output $P_S$. Before the step change only a single PLL is in operation. The double PLL is activated at the step change. The FIGS. 23a to 23c illustrate a significant reduction in the noise of the position error and the angular frequency estimate by the double PLL.

Numerous other embodiments of the invention will be apparent to persons skilled in the art without departing from the spirit and scope of the invention as defined in the appended claims.

What is claimed is:

1. A method comprising:
receiving signals indicative of stator currents and rotor currents of a doubly-fed induction machine, the stator currents and the rotor currents being represented as a 2-phase vector in a α-β coordinate frame;
processing the rotor current vector with a rotor position estimate vector;
determining a scalar error quantity in dependence upon the stator current vector and the processed rotor current vector;
integrating the scalar error quantity;
determining an estimate of the rotor angular frequency in dependence upon the integrated scalar error quantity;
determining a rotor position estimate by integrating the estimate of the rotor angular frequency;
determining a rotor position estimate vector in dependence upon the rotor position estimate;
providing the rotor position estimate vector for processing the rotor current vector; and,
providing a signal indicative of the rotor position estimate vector and a signal indicative of the estimate of the rotor angular frequency for controlling the doubly-fed induction machine.

2. A method as defined in claim 1 comprising:
receiving signals indicative of stator voltages of the doubly-fed induction machine, the stator voltages being represented as a 2-phase vector in a α-β coordinate frame;
converting the stator voltages into a γ-δ coordinate frame using stator phase angle information;
determining a magnetization current vector in dependence upon the stator voltages in the γ-δ coordinate frame and a magnetization reactance;
converting the magnetization current vector into the d-q coordinate frame using the stator phase angle information; and,
combining the magnetization current vector and the stator current vector.

3. A method as defined in claim 1 comprising:
converting the rotor current vector into the γ-δ coordinate frame using the rotor position estimate vector;
receiving signals indicative of stator voltages of the doubly-fed induction machine;
determining complex powers $P_S$, $Q_S$ in dependence upon the stator voltages and the stator currents;
determining complex reference powers $P_S^*$, $Q_S^*$ using the estimate of the rotor angular frequency;
determining respective power errors by comparing the complex reference powers $P_S^*$, $Q_S^*$ with the complex powers $P_S$, $Q_S$;
determining respective stator reference currents by integrating the power errors;
determining control voltages by comparing the converted rotor current vector with the stator reference currents in negative feedback; and,
converting the control voltages from the γ-δ coordinate frame into a coordinate frame suitable for controlling the doubly-fed induction machine.

4. A method as defined in claim 2 comprising:
converting the rotor current vector into the γ-δ coordinate frame using the rotor position estimate vector;
receiving signals indicative of stator voltages of the doubly-fed induction machine, the stator voltages being represented as a 2-phase vector in a α-β coordinate frame determining complex powers $P_S$, $Q_S$ in dependence upon stator voltages and stator currents;
determining complex reference powers $P_S^*$, $Q_S^*$ using the estimate of the rotor angular frequency;
determining respective power errors by comparing the complex reference powers $P_S^*$, $Q_S^*$ with the complex powers $P_S$, $Q_S$;
determining respective stator reference currents by integrating the power errors;
determining a magnetization current and subtracting the same from the stator reference currents;
determining control voltages by comparing the converted rotor current vector with the stator reference currents in negative feedback; and,
converting the control voltages from the γ-δ coordinate frame into a coordinate frame suitable for controlling the doubly-fed induction machine.

5. A method as defined in claim 1 wherein determining an estimate of the rotor angular frequency comprises determining a first estimate of the rotor angular frequency in dependence upon the integrated scalar error quantity and determining a second estimate of the rotor angular frequency in dependence upon the integrated scalar error quantity by using the first estimate of the rotor angular frequency as central frequency and adding the same to the integrated scalar error quantity.

6. A method as defined in claim 1 wherein processing the rotor current vector with a rotor position estimate vector comprises $[e^{j\Theta_x}]$ mixing.

7. A method as defined in claim 1 wherein determining the scalar error quantity comprises multiplying one of the stator current vector and the combined current vector with the processed rotor current vector by multiplying sine components of the vectors with respective cosine components of the vectors and combining the multiplied vector components.

8. A method as defined in claim 1 wherein integrating the scalar error quantity comprises proportional integration.

9. A method as defined in claim 8 wherein a proportional gain is determined in dependence upon operation of the doubly-fed induction machine plus a slip.

10. A method as defined in claim 9 wherein, when a second estimate of the rotor angular frequency is determined, the proportional gain for integrating the scalar error quantity to determine the second estimate of the rotor angular frequency is determined such that noise in the estimate of the rotor angular frequency and the rotor position estimate is reduced.

11. A method as defined in claim 1 wherein determining an estimate of the rotor angular frequency comprises adding a central frequency to the integrated scalar error quantity.

12. A method as defined in claim 11 wherein the added central frequency is in proximity to a stator angular frequency.

13. A method as defined in claim 1 comprising:
receiving signals indicative of one of 2-phase and 3-phase stator currents and one of 2-phase and 3-phase rotor currents of the doubly-fed induction machine; and,
converting the stator currents and the rotor currents into respective 2-phase vectors in a α-β coordinate frame.

14. A system comprising:
a mixer for receiving a signal indicative of rotor currents of a doubly-fed induction machine and a signal indicative of a rotor position estimate vector, the rotor currents being represented as a 2-phase vector in a α-β coordinate frame, the mixer for processing the rotor current vector with the rotor position estimate vector;

a detector connected to the mixer, the detector for receiving a signal indicative of stator currents of the doubly-fed induction machine, the stator currents being represented as a 2-phase vector in a α-β coordinate frame, the detector for determining a scalar error quantity in dependence upon the stator current vector and the processed rotor current vector;

a first integrator connected to the detector for integrating the scalar error quantity;

an adder connected to the integrator for determining an estimate of the rotor angular frequency by adding the central frequency to the integrated scalar error quantity;

a second integrator connected to the adder for determining a rotor position estimate by integrating the estimate of the rotor angular frequency; and, a sin-cos block connected to the second integrator and to the mixer for determining a rotor position estimate vector in dependence upon the rotor position estimate; and, a first output port interposed between the adder and the second integrator for providing a signal indicative of the estimate of the rotor angular frequency and a second port connected to the sin-cos block for providing the signal indicative of the rotor position estimate vector, the first and the second output port for being connected to a control system of the doubly-fed induction machine.

15. A system as defined in claim 14 comprising:
a first coordinate frame transformation block for receiving a signal indicative of stator voltages of the doubly-fed induction machine, the stator voltages being represented as a 2-phase vector in a α-β coordinate frame and for converting the stator voltages into a γ-δ coordinate frame using stator phase angle information;

a magnetization reactance block connected to the first coordinate frame transformation block for determining a magnetization current vector in dependence upon the stator voltages in the γ-δ coordinate frame and a magnetization reactance; and, a second coordinate transformation block connected to the magnetization reactance block and to the detector for converting the magnetization current vector into a d-q coordinate frame using the stator phase angle information, and wherein the detector combines the magnetization current vector and the stator current vector.

16. A system as defined in claim 14 comprising:
at least an input coordinate frame transformation block connected to the second port for converting the rotor current vector into a γ-δ coordinate frame using the rotor position estimate vector;

a power calculation block for receiving a signal indicative of stator voltages and the signal indicative of the stator currents and for determining complex powers $P_S$, $Q_S$ in dependence thereupon;

a $P_S$, $Q_S$ reference generator connected to the first port for determining complex reference powers $P_S^*$, $Q_S^*$ using the estimate of the rotor angular frequency;

second adders connected to the $P_S$, $Q_S$ reference generator and to the power calculation block for determining respective power errors by comparing the complex reference powers $P_S^*$, $Q_S^*$ with the complex powers $P_S$, $Q_S$;

third integrators connected to the second adders for determining respective stator reference currents by integrating the power errors;

a negative feedback block connected to the third integrators and to the at least an input coordinate frame transformation block for determining control voltages by comparing the converted rotor current vector with the stator reference currents in negative feedback; and, at least an output coordinate frame transformation block connected to the negative feedback block and to the second port for converting the control voltages from the γ-δ coordinate frame into a coordinate frame suitable for controlling the doubly-fed induction machine.

17. A system as defined in claim 15 comprising:
at least an input coordinate frame transformation block connected to the second port for converting the rotor current vector into a γ-δ coordinate frame using the rotor position estimate vector;

a power calculation block for receiving a signal indicative of stator voltages and the signal indicative of the stator currents and for determining complex powers $P_S$, $Q_S$ in dependence thereupon;

a $P_S$, $Q_S$ reference generator connected to the first port for determining complex reference powers $P_S^*$, $Q_S^*$ using the estimate of the rotor angular frequency;

second adders connected to the $P_S$, $Q_S$ reference generator and to the power calculation block for determining respective power errors by comparing the complex reference powers $P_S^*$, $Q_S^*$ with the complex powers $P_S$, $Q_S$;

third integrators connected to the second adders for determining respective stator reference currents by integrating the power errors;

a magnetization reactance block for determining a magnetization current;

a third adder connected to one of the third integrators and to the magnetization reactance block for combining the magnetization current and one of the stator reference currents;

a negative feedback block connected to one of the third integrators, the third adder, and to the at least an input coordinate frame transformation block for determining control voltages by comparing the converted rotor current vector with the stator reference currents in negative feedback; and, at least an output coordinate frame transformation block connected to the negative feedback block and to the second port for converting the control voltages from the γ-δ coordinate frame into a coordinate frame suitable for controlling the doubly-fed induction machine.

18. A system as defined in claim 14 wherein the mixer comprises a $[e^{j\theta_x}]$ mixer.

19. A system as defined in claim 14 wherein the detector comprises:
a first and a second multiplier for multiplying sine components with respective cosine components of the current vectors; and,
an adder connected to the first and the second multiplier for combining the multiplied vector components.

20. A system as defined in claim 19 wherein the detector comprises:
a second adder connected to the first multiplier and a third adder connected to the second multiplier, the second and the third adder for combining the stator current vector and the magnetization current vector.

21. A system as defined in claim 14 comprising:
a first phase coordinate frame transformation block connected to the mixer for receiving a signal indicative of one of 2-phase and 3-phase rotor currents and for converting the one of 2-phase and 3-phase rotor currents into respective 2-phase vectors in a α-β coordinate frame; and, a second phase coordinate frame transformation block connected to the detector for receiving a signal indicative of one of 2-phase and 3-phase stator currents and for converting the one of 2-phase and 3-phase stator currents into respective 2-phase vectors in a α-β coordinate frame.

22. A system as defined in claim 21 comprising a third phase coordinate frame transformation block connected to the first coordinate frame transformation block for receiving a signal indicative of one of 2-phase and 3-phase stator voltages and for converting the one of 2-phase and 3-phase stator voltages into respective 2-phase vectors in a α-β coordinate frame.

23. A system as defined in claim 14 wherein the sin-cos block comprises a look-up table.

24. A system comprising:
a mixer for receiving a signal indicative of rotor currents of a doubly-fed induction machine and a signal indicative of a rotor position estimate vector, the rotor currents being represented as a 2-phase vector in a α-β coordinate frame, the mixer for processing the rotor current vector with the rotor position estimate vector;
a first detector connected to the mixer, the detector for receiving a signal indicative of stator currents of the doubly-fed induction machine, the stator currents being represented as a 2-phase vector in a α-β coordinate frame, the detector for determining a scalar error quantity in dependence upon the stator current vector and the processed rotor current vector;
a first integrator connected to the first detector for integrating the scalar error quantity;
a first adder connected to the integrator for determining a first estimate of the rotor angular frequency by adding a central frequency to the integrated scalar error quantity;
a second detector connected to the mixer, the detector for receiving a signal indicative of the stator currents of the doubly-fed induction machine, the stator currents being represented as a 2-phase vector in a α-β coordinate frame, the second detector for determining a second scalar error quantity in dependence upon the stator current vector and the processed rotor current vector;
a second integrator connected to the second detector for integrating the second scalar error quantity;
a second adder connected to the second integrator and to the first adder for determining a second estimate of the rotor angular frequency by adding the first estimate of the rotor angular frequency to the integrated second scalar error quantity;
a third integrator connected to the second adder for determining a rotor position estimate by integrating the second estimate of the rotor angular frequency;
a sin-cos block connected to the second integrator and to the mixer for determining a rotor position estimate vector in dependence upon the rotor position estimate; and,
a first output port interposed between the adder and the second integrator for providing a signal indicative of the estimate of the rotor angular frequency and a second port connected to the sin-cos block for providing the signal indicative of the rotor position estimate vector, the first and the second output port for being connected to a control system of the doubly-fed induction machine.

25. A system as defined in claim 24 comprising:
a first coordinate frame transformation block for receiving a signal indicative of stator voltages of the doubly-fed induction machine, the stator voltages being represented as a 2-phase vector in a α-β coordinate frame and for converting the stator voltages into a γ-γ coordinate frame using stator phase angle information;
a magnetization reactance block connected to the first coordinate frame transformation block for determining a magnetization current vector in dependence upon the stator voltages in the γ-δ coordinate frame and a magnetization reactance; and,
a second coordinate transformation block connected to the magnetization reactance block and to the first and the second detector for converting the magnetization current vector into a d-q coordinate frame using the stator phase angle information, and wherein the first and the second detector combine the magnetization current vector and the stator current vector.

26. A system as defined in claim 24 comprising:
at least an input coordinate frame transformation block connected to the second port for converting the rotor current vector into a γ-δ coordinate frame using the rotor position estimate vector;
a power calculation block for receiving a signal indicative of stator voltages and the signal indicative of the stator currents and for determining complex powers $P_S$, $Q_S$ in dependence thereupon;
a $P_S$, $Q_S$ reference generator connected to the first port for determining complex reference powers $P_S^*$, $Q_S^*$ using the estimate of the rotor angular frequency;
second adders connected to the $P_S$, $Q_S$ reference generator and to the power calculation block for determining respective power errors by comparing the complex reference powers $P_S^*$, $Q_S^*$ with the complex powers $P_S$, $Q_S$;
third integrators connected to the second adders for determining respective stator reference currents by integrating the power errors;
a negative feedback block connected to the third integrators and to the at least an input coordinate frame transformation block for determining control voltages by comparing the converted rotor current vector with the stator reference currents in negative feedback; and,
at least an output coordinate frame transformation block connected to the negative feedback block and to the second port for converting the control voltages from the γ-δ coordinate frame into a coordinate frame suitable for controlling the doubly-fed induction machine.

27. A system as defined in claim 25 comprising:
at least an input coordinate frame transformation block connected to the second port for converting the rotor current vector into a γ-δ coordinate frame using the rotor position estimate vector;
a power calculation block for receiving a signal indicative of stator voltages and the signal indicative of the stator currents and for determining complex powers $P_S$, $Q_S$ in dependence thereupon;
a $P_S$, $Q_S$ reference generator connected to the first port for determining complex reference powers $P_S^*$, $Q_S^*$ using the estimate of the rotor angular frequency;
second adders connected to the $P_S$, $Q_S$ reference generator and to the power calculation block for determining respective power errors by comparing the complex reference powers $P_S^*$, $Q_S^*$ with the complex powers $P_S$, $Q_S$;
third integrators connected to the second adders for determining respective stator reference currents by integrating the power errors;
a magnetization reactance block for determining a magnetization current;

a third adder connected to one of the third integrators and to the magnetization reactance block for combining the magnetization current and one of the stator reference currents;

a negative feedback block connected to one of the third integrators, the third adder, and to the at least an input coordinate frame transformation block for determining control voltages by comparing the converted rotor current vector with the stator reference currents in negative feedback; and, at least an output coordinate frame transformation block connected to the negative feedback block and to the second port for converting the control voltages from the γ-δ coordinate frame into a coordinate frame suitable for controlling the doubly-fed induction machine.

28. A system as defined in claim 24 wherein the mixer comprises a $[e^{j\Theta_x}]$ mixer.

29. A system as defined in claim 24 wherein the detector comprises:
a first and a second multiplier for multiplying sine components with respective cosine components of the current vectors; and,
an adder connected to the first and the second multiplier for combining the multiplied vector components.

30. A system as defined in claim 29 wherein the detector comprises:
a second adder connected to the first multiplier and a third adder connected to the second multiplier, the second and the third adder for combining the stator current vector and the magnetization current vector.

31. A system as defined in claim 24 comprising:
a first phase coordinate frame transformation block connected to the mixer for receiving a signal indicative of one of 2-phase and 3-phase rotor currents and for converting the one of 2-phase and 3-phase rotor currents into respective 2-phase vectors in a α-β coordinate frame; and,
a second phase coordinate frame transformation block connected to the detector for receiving a signal indicative of one of 2-phase and 3-phase stator currents and for converting the one of 2-phase and 3-phase stator currents into respective 2-phase vectors in a α-β coordinate frame.

32. A system as defined in claim 31 comprising a third phase coordinate frame transformation block connected to the first coordinate frame transformation block for receiving a signal indicative of one of 2-phase and 3-phase stator voltages and for converting the one of 2-phase and 3-phase stator voltages into respective 2-phase vectors in a α-β coordinate frame.

33. A system as defined in claim 24 wherein the sin-cos block comprises a look-up table.

34. A storage medium having stored therein executable commands for execution on at least a processor, the at least a processor when executing the commands performing:
receiving signals indicative of stator currents and rotor currents of a doubly-fed induction machine, the stator currents and the rotor currents being represented as a 2-phase vector in a α-β coordinate frame;
processing the rotor current vector with a rotor position estimate vector;
determining a scalar error quantity in dependence upon the stator current vector and the processed rotor current vector;
integrating the scalar error quantity;
determining an estimate of the rotor angular frequency in dependence upon the integrated scalar error quantity;
determining a rotor position estimate by integrating the estimate of the rotor angular frequency;
determining a rotor position estimate vector in dependence upon the rotor position estimate;
providing the rotor position estimate vector for processing the rotor current vector; and,
providing a signal indicative of the rotor position estimate vector and a signal indicative of the estimate of the rotor angular frequency for controlling the doubly-fed induction machine.

35. A storage medium having stored therein executable commands for execution on at least a processor as defined in claim 34, the at least a processor when executing the commands performing:
receiving signals indicative of stator voltages of the doubly-fed induction machine, the stator voltages being represented as a 2-phase vector in a α-β coordinate frame;
converting the stator voltages into a γ-δ coordinate frame using stator phase angle information;
determining a magnetization current vector in dependence upon the stator voltages in the γ-δ coordinate frame and a magnetization reactance;
converting the magnetization current vector into the d-q coordinate frame using the stator phase angle information; and,
combining the magnetization current vector and the stator current vector.

36. A storage medium having stored therein executable commands for execution on at least a processor as defined in claim 34, the at least a processor when executing the commands performing:
converting the rotor current vector into the γ-δ coordinate frame using the rotor position estimate vector;
receiving signals indicative of stator voltages of the doubly-fed induction machine;
determining complex powers $P_S$, $Q_S$ in dependence upon the stator voltages and the stator currents;
determining complex reference powers $P_S^*$, $Q_S^*$ using the estimate of the rotor angular frequency;
determining respective power errors by comparing the complex reference powers $P_S^*$, $Q_S^*$ with the complex powers $P_S$, $Q_S$;
determining respective stator reference currents by integrating the power errors;
determining control voltages by comparing the converted rotor current vector with the stator reference currents in negative feedback; and,
converting the control voltages from the γ-δ coordinate frame into a coordinate frame suitable for controlling the doubly-fed induction machine.

37. A storage medium having stored therein executable commands for execution on at least a processor as defined in claim 35, the at least a processor when executing the commands performing:
converting the rotor current vector into the γ-δ coordinate frame using the rotor position estimate vector;
receiving signals indicative of stator voltages of the doubly-fed induction machine, the stator voltages being represented as a 2-phase vector in a α-β coordinate frame
determining complex powers $P_S$, $Q_S$ in dependence upon stator voltages and stator currents;
determining complex reference powers $P_S^*$, $Q_S^*$ using the estimate of the rotor angular frequency;
determining respective power errors by comparing the complex reference powers $P_S^*$, $Q_S^*$ with the complex powers $P_S$, $Q_S$;

determining respective stator reference currents by integrating the power errors;

determining a magnetization current and subtracting the same from the stator reference currents;

determining control voltages by comparing the converted rotor current vector with the stator reference currents in negative feedback; and, converting the control voltages from the γ-δ coordinate frame into a coordinate frame suitable for controlling the doubly-fed induction machine.

38. A storage medium having stored therein executable commands for execution on at least a processor as defined in claim 34, the at least a processor when executing the commands performing:

determining a first estimate of the rotor angular frequency in dependence upon the integrated scalar error quantity and determining a second estimate of the rotor angular frequency in dependence upon the integrated scalar error quantity by using the first estimate of the rotor angular frequency as central frequency and adding the same to the integrated scalar error quantity.

* * * * *